United States Patent [19]

Doud

[11] Patent Number: 4,680,050
[45] Date of Patent: Jul. 14, 1987

[54] GLASSWARE MOLDING MACHINE WITH UNITARY AXIS MOLDING AND METHOD OF MOLDING GLASSWARE

[75] Inventor: Wilbur O. Doud, Muncie, Ind.
[73] Assignee: Ball Corporation, Muncie, Ind.
[21] Appl. No.: 864,055
[22] Filed: May 16, 1986
[51] Int. Cl.⁴ .............................................. C03B 9/193
[52] U.S. Cl. ............................................ 65/79; 65/78; 65/229; 65/241; 65/264
[58] Field of Search ......................... 65/163, 29, 78, 79, 65/229, 231, 241, 264

[56] References Cited

U.S. PATENT DOCUMENTS

| | | | |
|---|---|---|---|
| 688,924 | 12/1901 | Blair et al. | 65/79 |
| 2,254,992 | 9/1941 | Bridges | 65/241 X |
| 3,434,820 | 3/1969 | Zappia et al. | 65/229 X |
| 3,468,648 | 9/1969 | Nowak | 65/79 X |
| 4,276,076 | 6/1981 | Fenton | 65/241 |
| 4,339,264 | 7/1982 | Dahms | 65/241 X |
| 4,586,944 | 5/1986 | Romberg | 65/79 |

Primary Examiner—Arthur Kellogg
Attorney, Agent, or Firm—Gilbert G. Alberding

[57] ABSTRACT

A glassware molding machine includes a plunger and neck mold assembly that cooperates with a carriage and a parison blank mold to form a parison around a first vertical axis (46) in a forming station, and to suspend the completed parison by the neck ring portions. A pair of carriges, and body forming mold portions, alternately cooperate with the neck ring portions to form a container from the parison while the parison remains suspended by the neck ring portions and while the parison remains around the first vertical axis in the forming station. While one pair of forming mold portions transport a completed container from the forming station to a cooling and take-out station with the container held between the closed forming mold portions, the other pair of forming mold portions, are open and, with timing independent of the movement of the first pair move by rectilinear movement back to the forming station.

22 Claims, 19 Drawing Figures

GLASSWARE MOLDING MACHINE WITH UNITARY AXIS MOLDING AND METHOD OF MOLDING GLASSWARE

TECHNICAL FIELD

The present invention relates generally to an individual section glassware molding machine and to its method of operation. More particularly, the present invention relates to an individual section glassware molding machine in which a parison is molded circumferentially around a first vertical axis, and a container is formed from the parison without moving the parison away from the first vertical axis.

BACKGROUND ART

In the formation of glassware it has been common practice to form a blank, or parison, in a parison molding portion of the glassware molding machine, to automatically transfer the parison to a blowing molding portion of the glassware molding machine, and then to blow mold the parison into conformity to a blow mold.

In this prior art practice, the parison is commonly formed by a plunger which forms the internal surface and two separate molding portions which may have more than one part which form the external surface. The construction of these molds and their functions typically are as follows:

One of these molding portions forms the body of the parison, which is the portion of the parison that later will be blow molded. This body molding portion typically includes two sidewall mold halves that are transversely movable to open and closed positions about a central axis and are frequently referred to as the blank molds. It also incudes a bottom surface mold referred to as the baffle. The baffle mold is movable into and out of engagement with the blank mold halves to allow loading of the glass job into the inverted blank mold before forming of the parison.

Another of these molding portions forms the neck of the parison which is molded to its final size and shape, as contrasted to the body of the parison which subsequently is blow molded into its final size and shape. This neck molding portion includes two sidewall mold halves that are transversely movable to open and closed positions about a central axis and are frequently referred to as the neck rings. It also includes a top surface mold frequently referred to as the finish guide plate.

The top finish mold provides a top sealing surface to the container that is unmarred by a longitudinal seam, whereas the neck ring mold, being formed in two halves, leaves a seam line on that portion of the parison that is formed within the neck ring portions.

After the parison is formed by thse two molding portions and the parison plunger, the parison, which is still retained within the neck ring, is transported to a blow molding portion of the individual section glassware molding machine. Typically the parison is molded with the neck ring at the bottom of the parison; and a neck ring holder transports the parison to the blow mold portion of the machine by swinging the parison upwardly in a one hundred eighty degree arc, and places it in an upright position in a blow molding station.

There are several disadvantages and problems that are inherent in machines that are constructed as noted above. One of the inherent problems is that there are conflicting requirements for the physical properties of the parison.

The neck portion of the parison must be sufficiently cool to provide the physical properties that will enable transporting the body portion of the parison to the blow mold and to retain the dimensional requirements of the finished container. And yet, the body portion of the parison must be sufficiently hot and plastic to enable it to be blow molded to the size and shape of the finished container.

Further, the body portion of the parison must be sufficiently cool to provide the physical properties that can resist acceleration, deceleration, and centrifugal forces on the body portion during transport from the parison molding portion to the blow molding portion of the machine. And yet, the body portion must be sufficiently hot and plastic to enable it to be blow molded to the size and shape of the finished container.

These mutually contradictory temperature and physical requirements for the parison have resulted in unduly long cycle times for glassware molding machines of this type because of the need for a reheat cycle that has been interposed between the parison molding step and blow molding step. This reheat cycle, at the expense of production rate, has reheated and resoftened the body portion of the parison after transporting the parison to the blow molding portion of the machine.

However, distortions in the parison, as caused by forces imposed on the parison during transport, have not been corrected by reheating; and these distortions in the parison have resulted in glassware that is uneven in thickness, that is easily broken, and/or in glassware that fractures during blow molding, or in subsequent handling thereof. In order to obtain sufficient strength in the finished product, it has been necessary to design glassware with thicknesses that are excessive from the standpoint of the raw materials required, the heat required for melting, shipping costs of finished containers to food processors, and shipping costs of filled containers to consumers.

Another problem that typically has plagued machines of the prior art type is that the parison blank molds have been made in two separable halves; and so the parison typically has had a seam line, a difference in thickness in circumferentially different portions of the parison, and a sudden change at the same line due to temperature differences caused by the mold discontinuities.

In addition, machines of the type described have not provided god radial alignment between the parison plunger and the parison neck molds. This misalignment, together with the above-noted problems of the blank mold halves, has caused unequal wall thickness in the parison; and this unequal wall thickness in the parison has caused excessive losses in manufacturing, excessive thick wall designs for containers, excessive cost for glass raw materials, excessive costs for thermal energy in manufacturing, and excessively high costs for shipping.

The failure of machines as described above to provide good radial alignment has also resulted in excessive wear between the parison neck mold parts and the parison plunger, at times even resulting in particles of metal being sheared off of either the parison plunger or the neck mold parts, and thereby resulting in particles of metal being molded into the parison.

Another cause of impurities has been the method of forming the parison in an inverted position. In typical constructions, the parison plunger enters the parison mold from below, and a gob of molten glass is dropped into an opening in the top of the inverted parison blank mold; so that contamination particles in the environment can drop directly onto the parison plunger.

Another disadvantage of the prior machines is that it has been common practice to deposit finished glassware onto a dead plate and then to slide the finished glassware onto a conveyor. This extra step in the process results in damage to the outside container surfaces, lowering container strength and causing breakage of containers in handling and in filling and processing of products in the containers.

Another problem with machines as described above has been an excessively large number of adjustments that are required either for changing from one size of container to another, for obtaining and maintaining alignment of machine elements, and for changes required to achieve an acceptable transfer of the parison to the blow mold. Typically, there have been over ten different types of adjustments related to merely change from molding one size of container to another size.

Finally, because of the contradictory requirements for physical strength and plasticity in the parison, for frequent adjustments needed for acceptable parison transfer, the readjustments needed after initial heating of molds and for frequent adjustments needed for delicate gob loading, it has taken an excessive number of hours of continuous running of a given mold before the percentage of rejects drops to an acceptable level.

There have been attempts in the prior art to overcome the difficulties and disadvantages of machines of the type described above; but all such attempts have fallen short for optimizing advantages and minimizing disadvantages.

The prior art discloses glassware forming devices, especially of the paste mold type, that provide for maintaining a fixed, axial alignment of the parison plunger and neck ring mold for parison forming and the blow mold for finished article forming. For example U.S. Pat. No. 3,142,552 to Martin discloses generally such a forming means wherein the parison is not transferred until after it is blow molded into the finished article. Although said apparatus of Martin is satisfactory for making paste moldings for seamless glass articles, such an apparatus is not practical nor economical because of its speed limitations for high production of commercial glass containers including wide mouth food jars and the like. Another glassware forming device that provides a vertical alignment of the blank mold and neck ring mold for parison forming and the blow mold for finished article forming is disclosed in U.S. Pat. No. 4,002,449 to Martin. In the device of Martin, two interconnected sets of blow molds and neck rings are employed to oscillate between the forming position and the take-out position, and single sets of blank molds and plungers are moved into and out of the forming position in timed relation therewith. While there are some advantages to the machine which is disclosed by Martin, one obvious limitation of his design is in the oscillating movement and the inherent difficulty of providing precise alignment between the parison plunger, which is fixed with regard to a single actuating axis, and the oscillating neck ring assemblies. Another apparent disadvantage with his machine is that the motions of the two neck ring and blow mold assemblies are tied together; so the machine is inherently slow because cycle time economies cannot be achieved by timing motions according to the needs of each step in the process.

For an effective and economical manufacture of glass containers such as used in the food packaging industry, it would be highly desirable to have a forming machine combining the features of single station forming of parison and finished containers with an upright solid blank, precision alignment of plunger and neck ring mechanisms, and high-speed, damage-free transfer from the forming station, a combination of features for a glass-forming machine not found in the prior art.

Therefore, it is a primary object of the invention to form the parison an then to form the finished container without moving the parison from one axis to another, thereby minimizing distortion to the parison, eliminating handling damage of the parison, reducing the time required to reheat the parison, reducing the scrap rate of blow molding distorted parisons and parisons with surface damage, and increasing the production rate.

It is another primary object of the invention to provide superior alignment between the parison plunger and the neck ring assembly, thereby achieving improved uniformity in wall thicknesses of the parisons, eliminating wear between the parison plunger and neck mold assembly, reducing parison contamination from wear particles, and increasing the strength of the formed glassware through better uniformity of the parisons and less contamination in the glass.

It is another primary object of the invention to use two body forming mold assemblies for a single parison forming assembly and to independently time the movement of the body forming assemblies between a forming station and a cooling and take-out station, thereby increasing the production rate.

It is another primary object of the present invention to provide a glassware molding machine in which the number of adjustments that are required to change from one job to another, and time that is required to achieve optimum running conditions and a minimum scrap rate, are both reduced.

It is another object of the invention to eliminate the blowhead portion of the body molding assembly, to replace the blowhead with an integrated body molding mechanism, to vacuum form the completed containers, and to provide an internal cooling device that does not touch the body forming molds, thereby eliminating mismatching of the forming mold portions, and eliminating cracks and broken glassware that are caused by excessive forming pressures.

It is another object of the invention to provide a take-out mechanism that will take the finished containers from the body forming mold with controlled acceleration forces, and that will deposit the finished article onto a conveyor with an optimized distance between containers, thereby minimizing handling damage and minimizing damage from containers rubbing together.

It is an object of the present invention to reduce container glass weight and to improve container wall strength: by minimizing contamination of the parison from particles sheared or worn from the parison plunger and neck molds through misalignment of these parts, by minimizing surface damage to the parison from contamination of the parison, by minimizing variations in wall thicknesses of the parisons through improved concentricity of parison plunger and neck molds, by minimizing variations in wall thicknesses of the parisons through the use of a one-piece parison blank mold, by minimizing handling damage and distortion to the parison prior to body molding, by minimizing handling damage of the finished container, and by minimizing variations in the wall thickness of the finished container.

Finally, it is an object of the present invention to reduce the costs of raw materials, thermal energy and shipping by strengthening the walls of the container, by achieving better uniformity in the wall thicknesses of the containers, and by a subsequent reduction in wall thicknesses of the containers.

DISCLOSURE OF THE INVENTION

In the present invention, an individual section glassware molding machine includes a machine base, a machine section frame that is attached to the machine base, and process stations that are longitudinally disposed with respect to the machine section. The process stations include a gob-loading station, a forming station, a cooling and take-out station, and a conveyor transport station.

The glassware molding machine includes a parison plunger and neck mold assembly. The plunger and neck mold assembly includes a reciprocating actuator having a cylinder barrel that is attached to the machine section frame, and having a piston rod that is disposed circumferentially around a first vertical axis. A plunger head is attached to the piston rod; and a parison plunger is attached to the plunger head. A support plate is disposed orthogonally to the first vertical axis and is attached to the cylinder barrel.

A neck mold subassembly is disposed under the parison plunger and circumferentially around the first vertical axis, is slidably mounted to the support plate, and includes neck ring halves that open and close by movement transverse to the first vertical axis.

Further, the neck mold subassembly includes a finish guide plate that is disposed radially inward from the neck ring halves and that radially contacts the neck ring portions when the neck ring portions are in their closed positions, and a finish guide sleeve that is aligningly disposed radially intermediate of the plunger head and the cylinder barrel of the actuator, and aligningly engages the finish guide plate.

The glassware molding machine section includes a parison blank mold assembly having a carriage that is mounted to the machine section frame by means of a pair of guide shafts that are longitudinally disposed, and that is movable between the forming station and the gob loading station by a transport screw and a rotary actuator; and the blank assembly includes a single piece blank mold that is attached to the blank mold carriage by a second reciprocating actuator and that is raised into contact with the neck ring portions by the second reciprocating actuator.

Each glassware molding machine section includes a first and second body forming mold assembly, each of which includes at least one pair of separable mold halves. The first and second body mold assemblies are mounted to first and second body mold carriages, respectively. Each of the body mold carriages is mounted to the machine section frame by means of longitudinally disposed guide shafts; and each of the body mold carriages is independently transported between the forming station and the cooling and take-out station by a transport screw and a rotary power actuator.

Finally, the glassware molding machine section includes a take-out assembly having a take-out carriage that is supported by support shafts and that is transported between the conveyor transport station and the cooling and take-out station by a transport screw and a rotary power actuator.

The take-out assembly includes one or more gripper jaws each of which is independently positioned along a horizontal axis perpendicular to the travel of the take-out carriage by a transport screw and a rotary power actuator, and is positioned vertically by a transport screw and a rotary power actuator.

In operation, the parison blank mold is moved to the gob loading station, receives a gob of glass, moves to the forming station, and moves upwardly into contact with the neck ring portions. The parison plunger moves downwardly through the neck mold portions and into the blank mold to form a parison and then moves upwardly again.

The blank mold moves downwardly from the neck mold portions leaving the parison suspended by the neck ring portions, the body forming mold portions of the first body mold assembly close around the parison, the neck mold portions move downward to the body mold portions, the parison is formed by a vacuum in the first forming body mold assembly, and the neck ring portions open and move upwardly to allow transverse movement of the first body mold assembly and the completed container therein.

The first body mold assembly moves longitudinally from the forming station, taking the completed container between the closed body mold portions thereof toward the cooling and take-out station.

As the body mold carriage clears the forming station, the internal cooling tube swings into position and is inserted into the container to start the cooling cycle, which continues after the carriage reaches the cooling and take-out station. After the flow of cooling fluid has sufficiently cooled the inside container surfaces, the cooling subassembly moves back out of the way for the take-out gripper jaws.

Before being grasped by gripper jaws, the body side mold halves of the first body mold open, and the neck of the completed container is grasped by the gripper jaws. The container is then raised off of the bottom mold, transported to the conveyor station and deposited onto a conveyor belt.

The first body mold assembly is than transported back toward the forming station with the body mold portions thereof opened to approximately one hundred eight degrees; and because they are opened and folded back, the second body mold assembly, with the body mold portions thereof closed, is able to move from the forming station to the cooling and take-out station along the very same path taken by the first body mold assembly in going from the cooling and take-out station to the forming station.

BEST MODE FOR CARRYING OUT THE INVENTION

Figure 1:
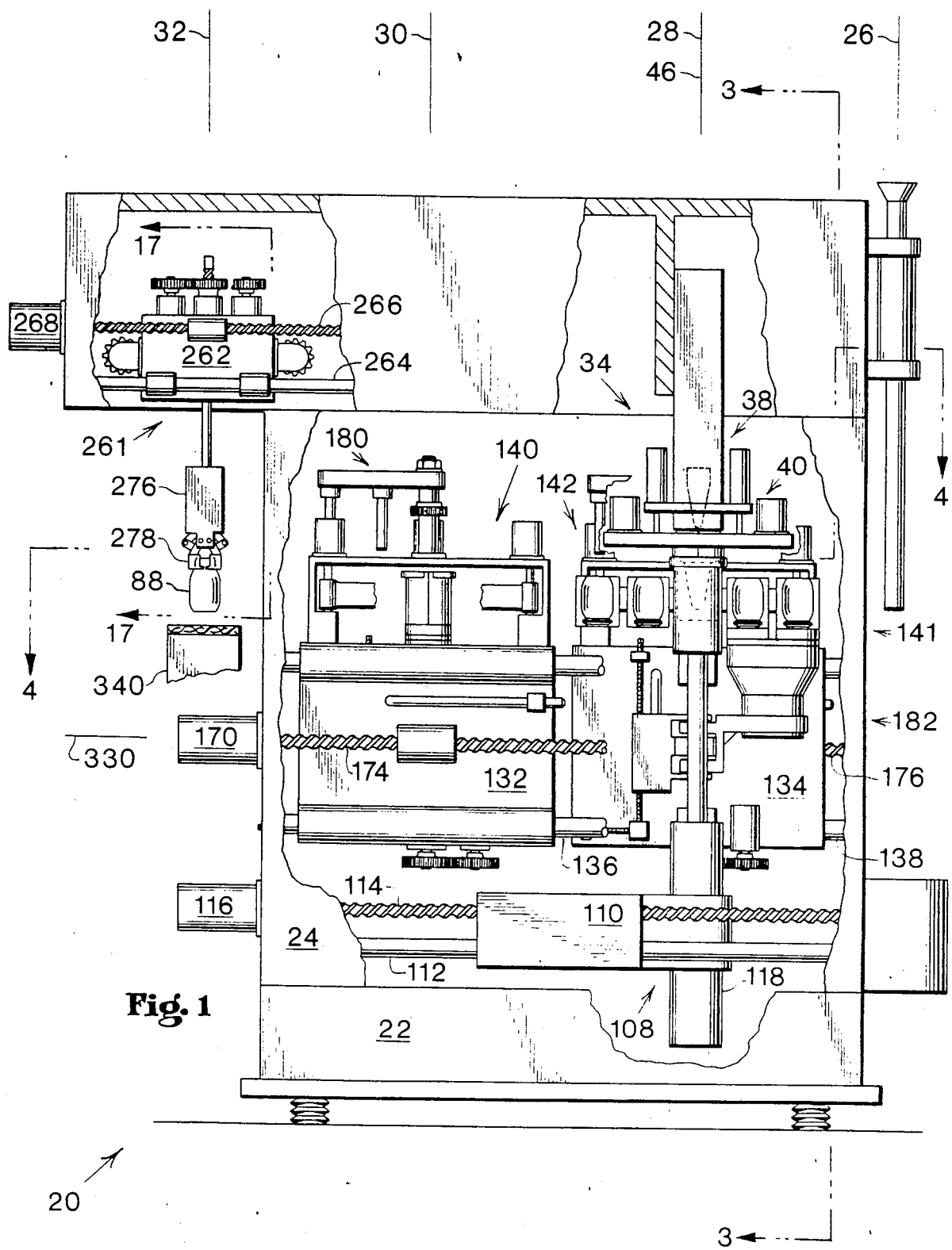
FIG. 1 is a side elevation of a preferred embodiment of the glassware molding machine section, showing the portion of the cycle in which a parison is being formed.
Figure 3:
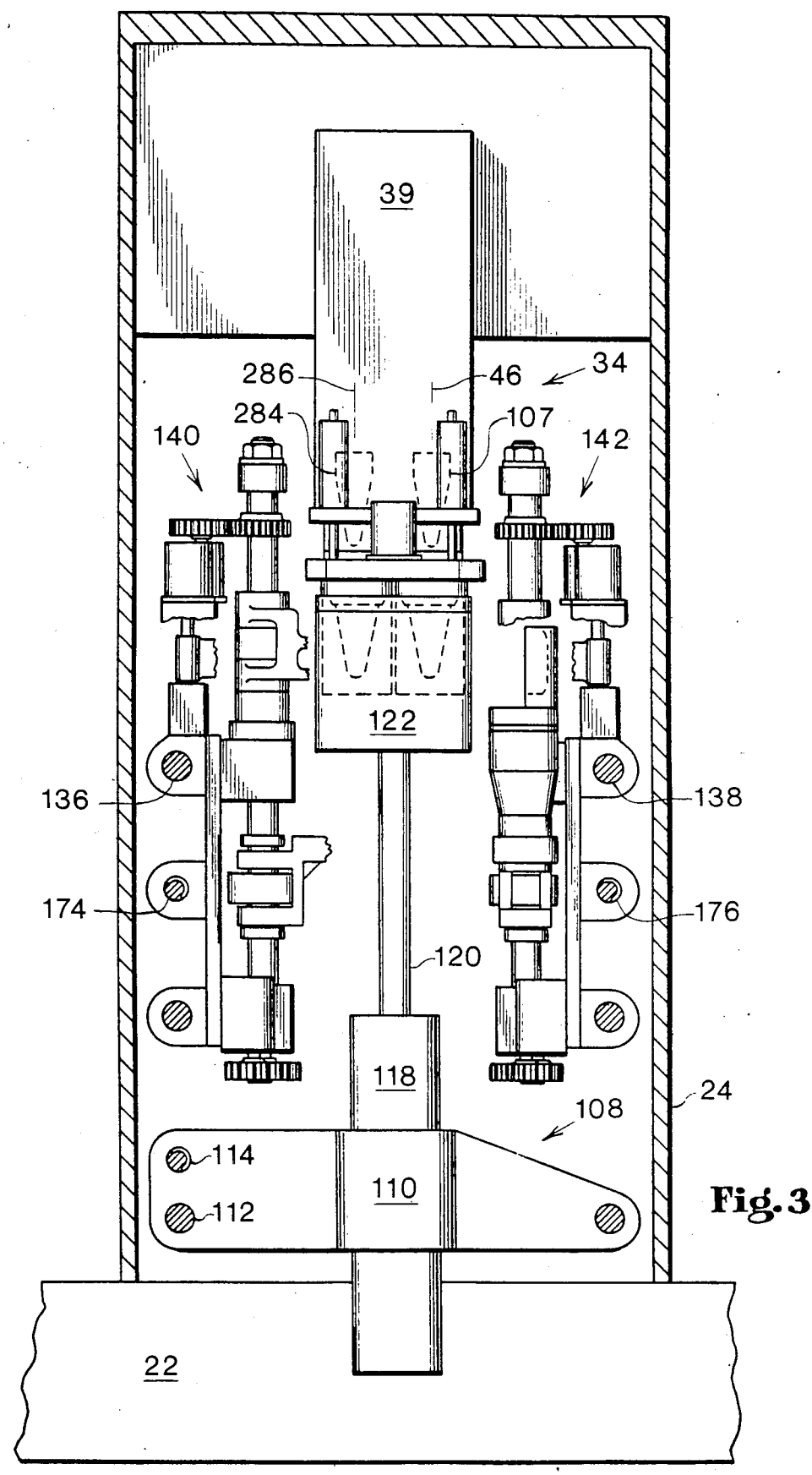
FIG. 3 is a cross-sectional elevation of the glassware molding machine of FIG. 1, taken substantially as shown by section line 3—3 of FIG. 1, showing a parison mold having two cavities in phantom lines, and showing two parison plungers in the upper positions thereof in phantom lines.
Figure 5:
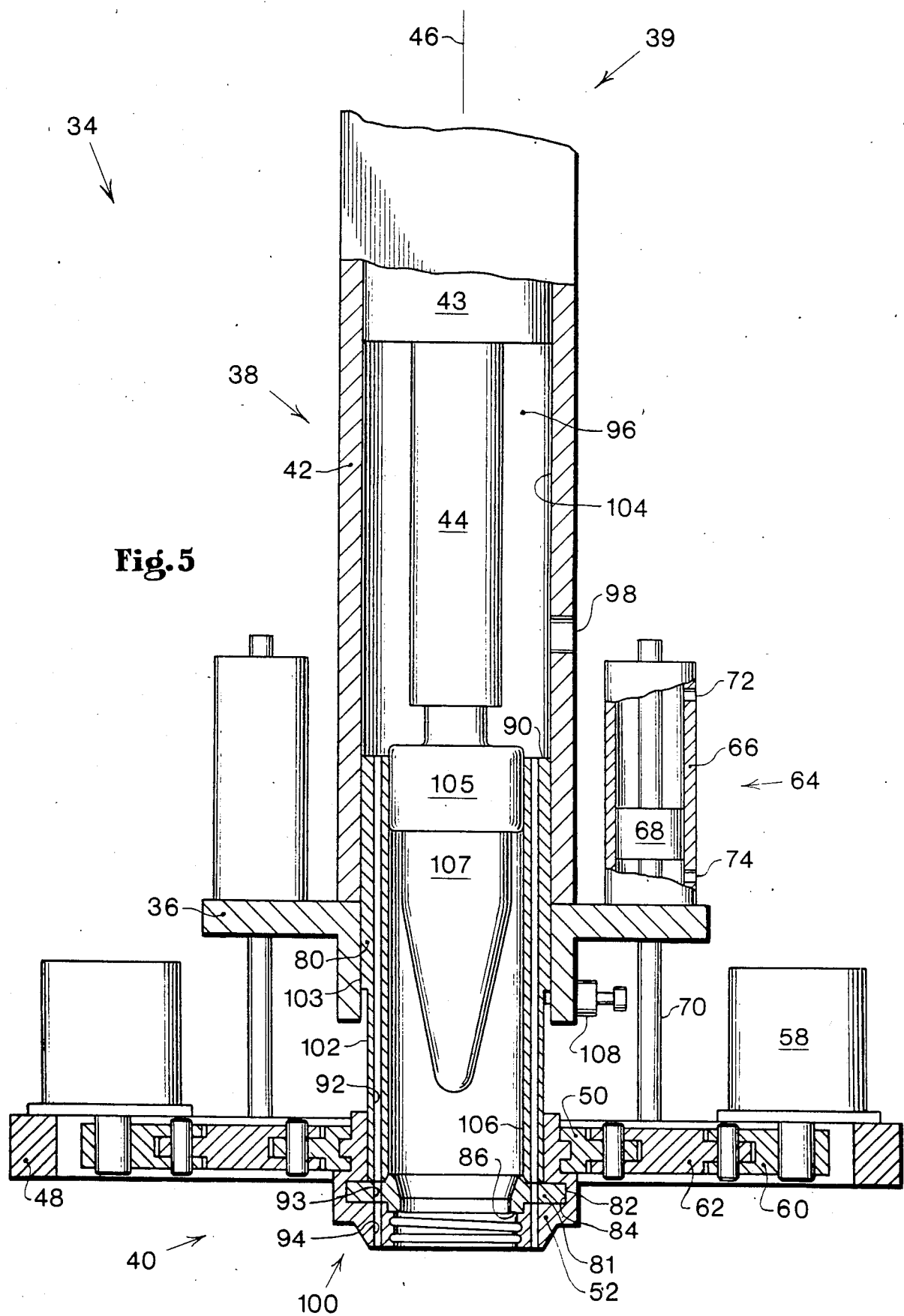
FIG. 5 is an enlarged partial cross section of the plunger and neck mold assembly, taken substantially the same as FIG. 2 and by view section lines 5—5 of FIG. 6, showing both the guiding and the radial aligning of the neck mold portions and showing the neck mold cooling means.

Referring now to the drawings, and more particularly to FIGS. 1, 3, and 5, an individual section glassware molding machine 20 includes a machine base 22, and a machine section frame 24 that is structurally attached to the machine base 22.

The molding machine 20 includes a gob loading station 26, a forming station 28, a cooling and take-out station 30, and a transport station 32.

In the preferred embodiment which is herein described, two parisons are formed substantially simultaneously, and two completed containers are formed substantially simultaneously. However for the sake of simplicity, the forming of only one parison, and the forming of only one container, will usually be described in the succeeding paragraphs. Other embodiments could form one or more than two parisons simultaneously.

The molding machine 20 includes a plunger and neck mold assembly 34 which is shown in greater detail in FIG. 5. The plunger and neck mold assembly 34 includes a support plate 36, a cylinder barrel 42 of plunger assembly 38 that is secured to the support plate 36, and a neck mold subassembly 40 that is guidingly attached to the support plate 36.

The plunger subassembly 38 includes a reciprocating actuator 39 which has a cylinder barrel 42, a piston 43, and a piston rod 44, all of which are disposed circumferentially around a first vertical axis 46 in the forming station 28.

Figure 6:
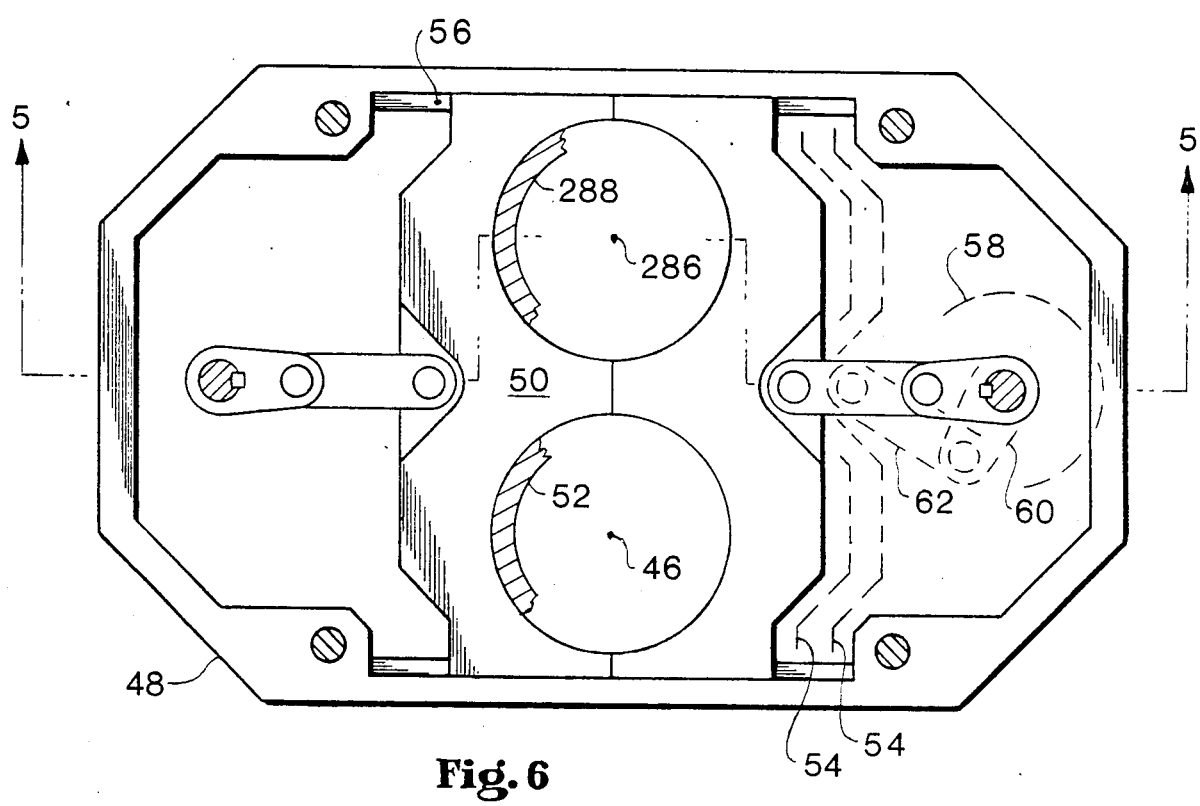
FIG. 6 is a top view of the neck mold subassembly of the plunger and neck mold assembly of FIG. 5A, taken substantially as shown by view lines 6—6 of FIG. 5.

Referring now to FIGS. 5 and 6, the neck mold subassembly 40 includes a frame 48, neck ring holders 50, and neck mold portions 52 and 81. The neck ring holders 50 are slidably connected to the frame 48 by guide surfaces 56; and both the neck ring holders 50 and the neck ring portions 52 held in the holders by locks (not shown) are movable to open and closed positions by rotary actuators 58, arms 60, and links 62. The open position is variable as shown by phantom lines 54 in FIG. 6.

It should be appreciated that the neck ring portions herein are two in number as opposed to a multi-segmented neck ring. Further, the neck ring portions are configured to accommodate a wide mouth container having a threaded finish, generally formed by two ring halves, said rings being positioned to open and close in substantially a horizontal plane or at right angle away from the vertical axis of the container.

The assembly 34 includes four smaller reciprocating actuators 64 that are parallel to and spaced apart from the first vertical axis 46, and that are fixedly secured to the support plate 36.

The smaller reciprocating actuators 64 each include a cylinder barrel 66, a piston 68, and a piston rod 70 that is fixedly secured to the piston 68 and to the frame 48 of the neck mold subassembly 40.

The four smaller reciprocating actuators 64 cooperate with each other to lower the neck mold subassembly 40 in response to pressurized air supplied to lowering ports 72, and to raise the neck mold subassembly 40 in response to pressurized air supplied to raising ports 74.

The neck mold subassembly 40 is guided along the first vertical axis 46 by the piston rods 70 aligningly engaging bearings (not shown) of the reciprocating actuators 64.

The plunger and neck mold assembly 34 includes a finish guide plate 81 and a finish guide sleeve 80. The finish guide plate 81 includes an annular projection 82 that engages arcuate grooves 84 in the neck ring portions 52, a top finish surface 86 which cooperates with the neck ring portions 52 to form the finish portion of containers 88. The finish guide sleeve 80 has an upper end 90, and a plurality of cooling holes 92 that are longitudinally disposed and circumferentially spaced. The cooling holes 92 cooperate with cooling holes 93 and 94 in the neck mold portions 52 and 81 to cool the top finish surface 86 of the finish guide plate 81 and the neck ring portions 52 as cooling fluid is supplied to a chamber 96 through a port 98.

The plunger and neck mold assembly 34 includes radial aligning means 100. The radial aligning means 100 includes the neck ring portions 52 radially aligning with a smaller outer surface 102 of the finish guide sleeve 80, a larger outer surface 103 of the finish guide sleeve 80 slidingly engaging an inside bore 104 of the cylinder barrel 42, a plunger head 105 slidably engaging an internal surface 106 of the finish guide sleeve 80, and a parison plunger 107 being fixedly secured to the plunger head 105. Thus when the neck ring portions 52 are in their closed positions as shown in FIGS. 5 and 6, the finish guide sleeve 80 is radially aligned to the neck ring portions 52; and the plunger 107 is continuously aligned with the finish guide plate 81, whether the neck mold assembly 40 is in its upper position or its lower position, and whether the plunger 107 is in its upper position or its lower position.

It can be appreciated that the sleeve 80 and the finish guide plate 81 as shown in FIG. 5 are two separate units but they may, if desired, be formed as one piece or interconnected as one piece.

Finally, the plunger and neck mold assembly 34 includes a manual locking device 108 which, when engaged with the smaller outer surface 102 of the finish guide sleeve 80, is effective in retaining the finish guide sleeve 80 when changing neck mold portions 52 and 81.

Figure 5A:
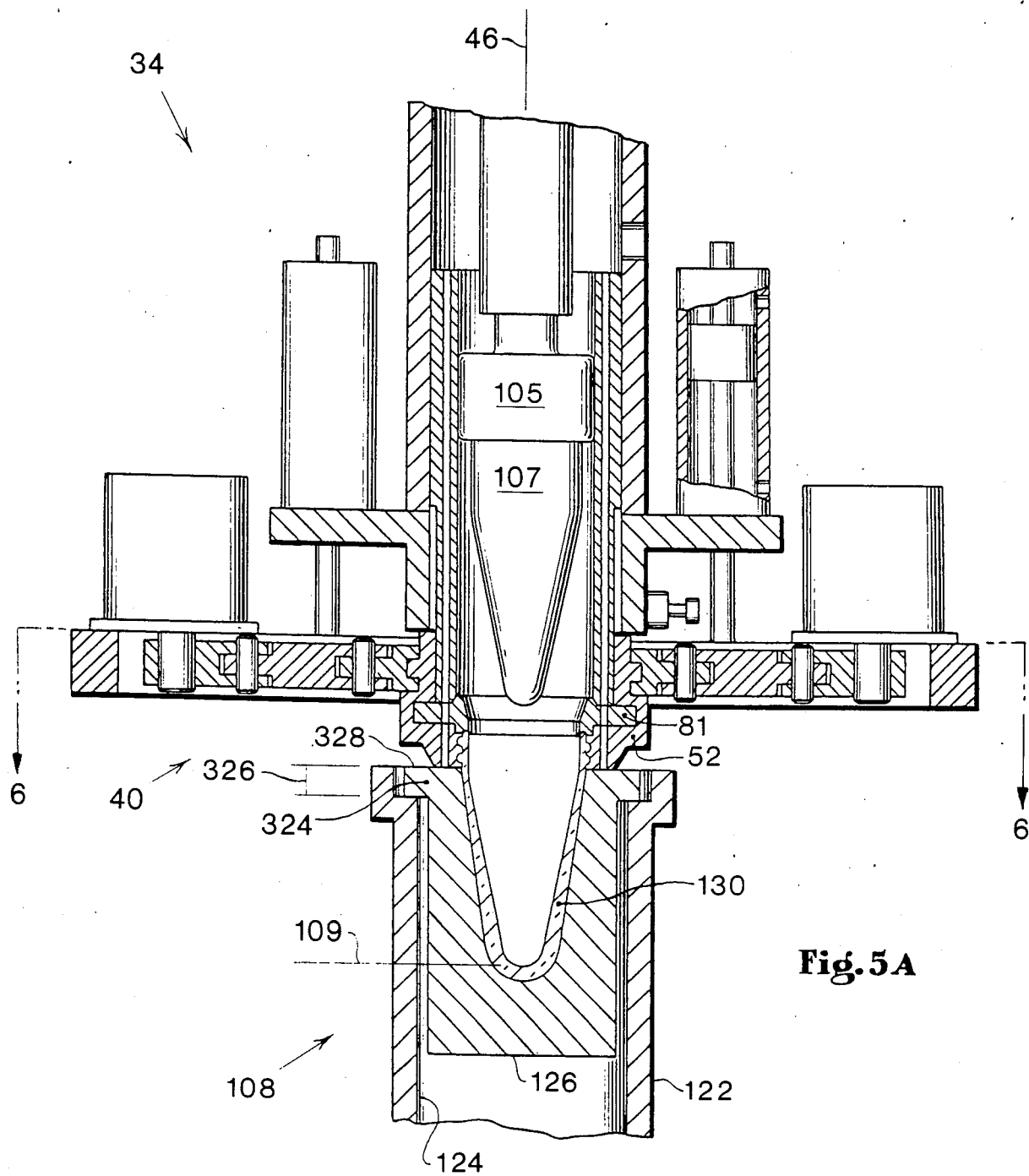
FIG. 5A is similar to FIG. 5, taken substantially the same as FIG. 1, showing the engagement of the parison blank mold.

The parison plunger 107 is attached to the piston rod 44 by a plunger head 105, and the parison plunger 107 is movable vertically between an upper position as shown in FIG. 5, and a lower position as indicated by a line 109 of FIG. 5A. Thus the neck mold subassembly 40, together with the neck mold portions 52 and 81 thereof, and the parison plunger 107 are all guided for vertical movement along the first vertical axis 46.

Figure 2:
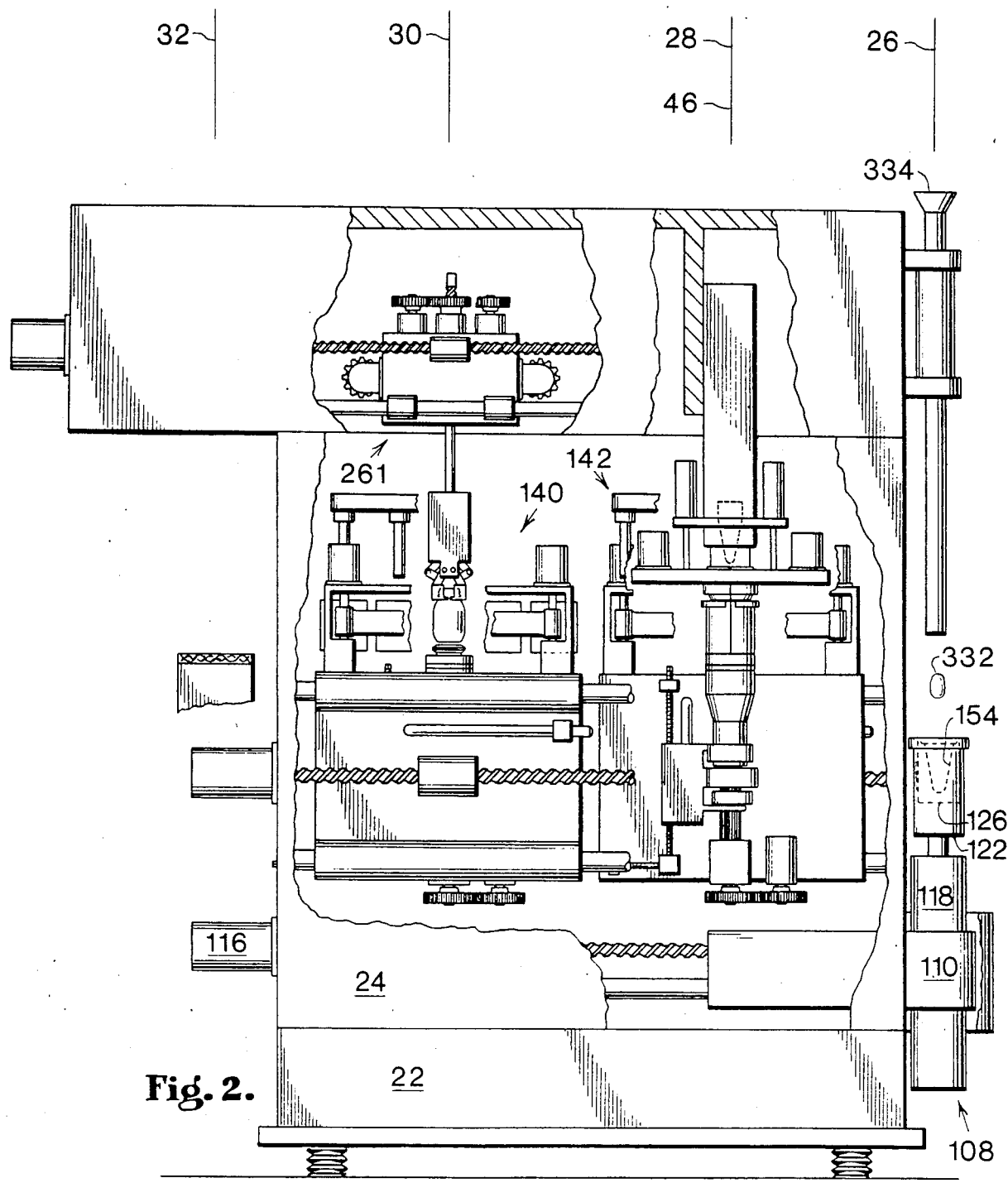
FIG. 2 is a side elevation of the glassware molding machine section of FIG. 1, showing the portion of the cycle in which one of the body forming molds is closed around a parison in the forming station and the parison blank mold is receiving a glass gob.

Referring now to FIGS. 1-3, the glassware molding machine 20 includes a parison blank mold transport carriage 110, a part of parison blank mold assembly 108, that is slidably mounted on longitudinally disposed support guide shafts 112 and that is transportable between the gob loading station 26 and the forming station 28 by a transport screw 114 and a rotary actuator 116. A reciprocating actuator 118, having a piston rod 120, is attached to the carriage 110. A blank mold holder 122 is attached to the piston rod 120 and includes a cavity 124 for slidably receiving a blank mold 126. The blank mold holder 122, the cavity 124, and the blank mold 126, are more clearly shown in FIG. 5A.

In FIGS. 1 and 5A, the blank mold 126 is shown raised along the first vertical axis 46 to its upper position, and abuts the neck ring portions 52. The parison plunger 107 is shown in FIG. 5A in its upper position; and it is shown in its lower position by the line 109 wherein it cooperates with the neck mold portions 52 and 81 and with the blank mold 126 to form a parison 130.

As shown in FIG. 5A, the blank mold 126 includes a flange 324 having a vertical height 326. Without regard to the sizes of the parisons 130 being molded, the vertical height 326 of the flange 324 is always the same; and a top 328 of the blank mold 126 is always at the same position. Thus, without regard to the size of the parison 130 being molded, no adjustment in height is required of the plunger and neck mold assembly 34 of of the blank mold assembly 108.

Figure 4:
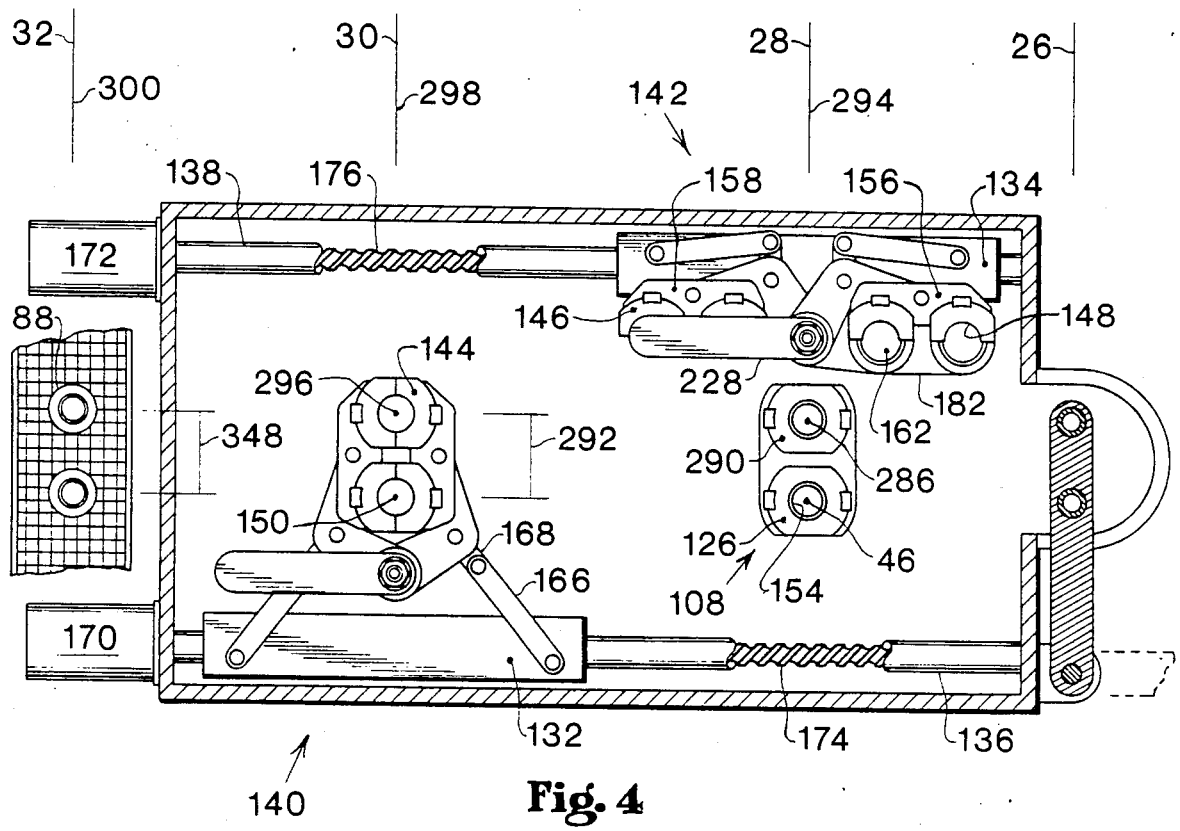
FIG. 4 is a plan view of the body forming mold assemblies together with the blank molds and mold holder, taken substantially as shown by view line 4—4 of FIG. 1, showing one of the body molds opened in the forming station and the other of the body molds closed in the cooling and take-out station.

Referring now to FIGS. 1 and 4, the glassware molding machine 20 also includes a first body forming mold assembly 140 and a second body forming mold assembly 142 which are substantially identical to one another except that one is right-handed and the other is left-handed.

Figure 7:
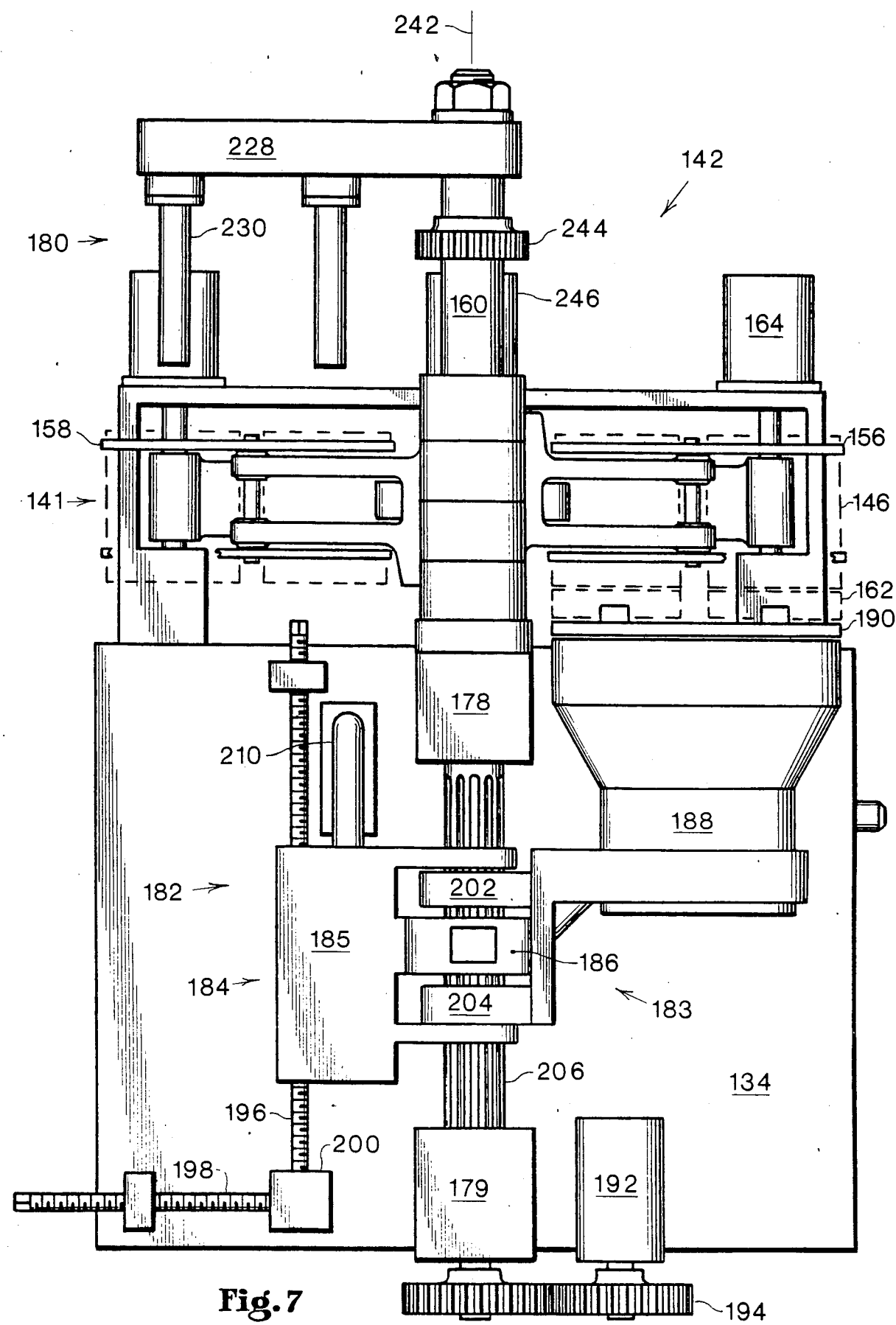
FIG. 7 is an enlarged elevation view of the body molding assembly, taken substantially as shown in FIG. 1, showing the subassemblies for opening and closing the body molds, showing the vacuum forming mechanism and showing the internal cooling subassembly of the body molding assembly.

Referring now to FIGS. 1 and 7, the body molding assembly 142 includes the transport carriage 134 together with the body side mold subassembly 141, the body bottom mold subassembly 182, and the internal cooling subassembly 180.

The body side mold subassembly 141 includes body side mold holders 156 and 158 which are pivotally attached to the carriage 134 by a shaft 160 best shown in FIG. 7; and one of the two side mold halves 146 is secured to each of the body mold holders 156 and 158.

The body side mold halves 146 are actuated to the opened position as shown, and to the closed position as shown for the body side mold halves 144, by rotary actuators 164 which are shown in FIGS. 1, 4 and 7, by arms 166, and by links 168.

Figure 8:
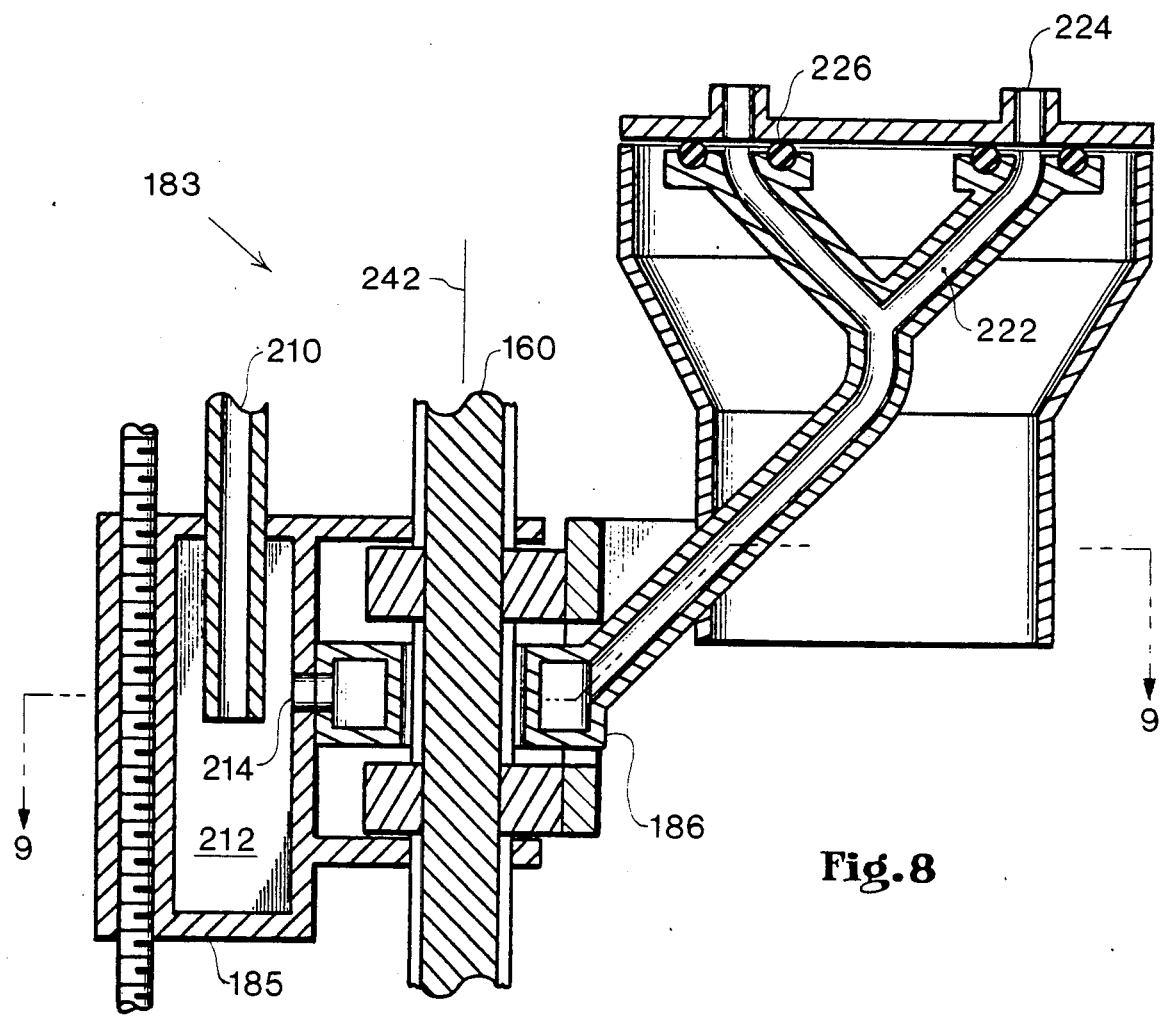
FIG. 8 is a partial cross-sectional view of the body molding assembly of FIG. 7, taken substantially the same as FIG. 7, and showing the vacuum forming portion thereof.
Figure 9:
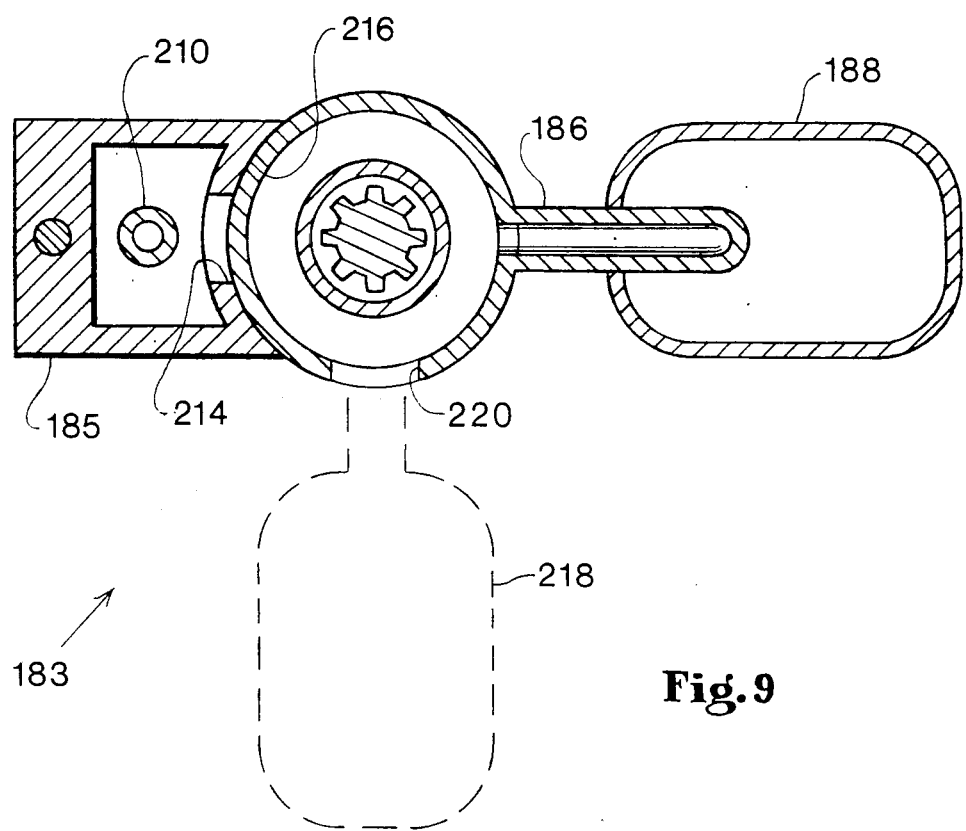
FIG. 9 is a cross-sectional view of the vacuum forming mechanism of FIG. 8, taken substantially as shown by section line 9—9 of FIG. 8.

Referring now to FIGS. 7-9, the bottom mold subassembly 182 includes a height adjustment mechanism 184 having a housing 185, a vacuum manifold 186, a support frame 188, a bottom mold adapter plate 190, a rotary actuator 192, and positioner gears 194. The support frame 188 is pivotally supported by the shaft 160 held by bearings 178 and 179 and is rotated as will be described subsequently.

The height adjustment mechanism 184 for the body bottom mold subassembly 182 includes an adjusting screw 196, an adjusting screw 198, and a gear box 200 which interconnects the adjusting screws 196 and 198. The adjusting screw 198 may be rotated by a crank, not shown, to achieve rapid raising and lowering of the body bottom mold 162; and the screw 196 may be rotated with a wrench to provide final adjustment.

The support frame 188 includes support hangers 202 and 204 which encircle the shaft 160, and which receive rotational movement by means of the rotary actuator 192, the positioner gears 194 which interconnect the rotary actuator 192 and the shaft 160, and by a spline 206 on the shaft 160 that rotationally engages the support hangers 202 and 204. The rotary actuator 192 serves to position the bottom mold adapter plate 190, and the bottom mold portion 162 which is shown in phantom lines in FIG. 7, which rests on the bottom mold adapter plate 190, and which cooperates with the body side mold halves 146 to form the exterior portions of the completed container 88.

Referring now to FIGS. 7-9, a vacuum tube 210 communicates with a manifold chamber 212 of the housing 185. The manifold chamber 212 opens through a hole 214 to the vacuum manifold 186; and sealing contact between the manifold chamber 212 and the vacuum manifold 186 is made by arcuate sliding contact between the vacuum manifold 186 and an arcuate portion 216 of the housing 185, as shown in FIG. 9. In the FIG. 9 illustration, communication between the manifold chamber 212 of the housing 185 and the vacuum manifold 186 is precluded. In contrast, when the vacuum manifold 186 is rotationally positioned as shown by phantom lines 218, an opening 220 in the vacuum manifold 186 communicates with the hole 214 in the housing 185.

The vacuum manifold 186 includes branches 222 which communicate with tubular projections 224, and which are sealed by sealing rings 226. The tubular projections 224 communicate with similar openings, not shown, in the bottom mold portion 162.

Figure 10:
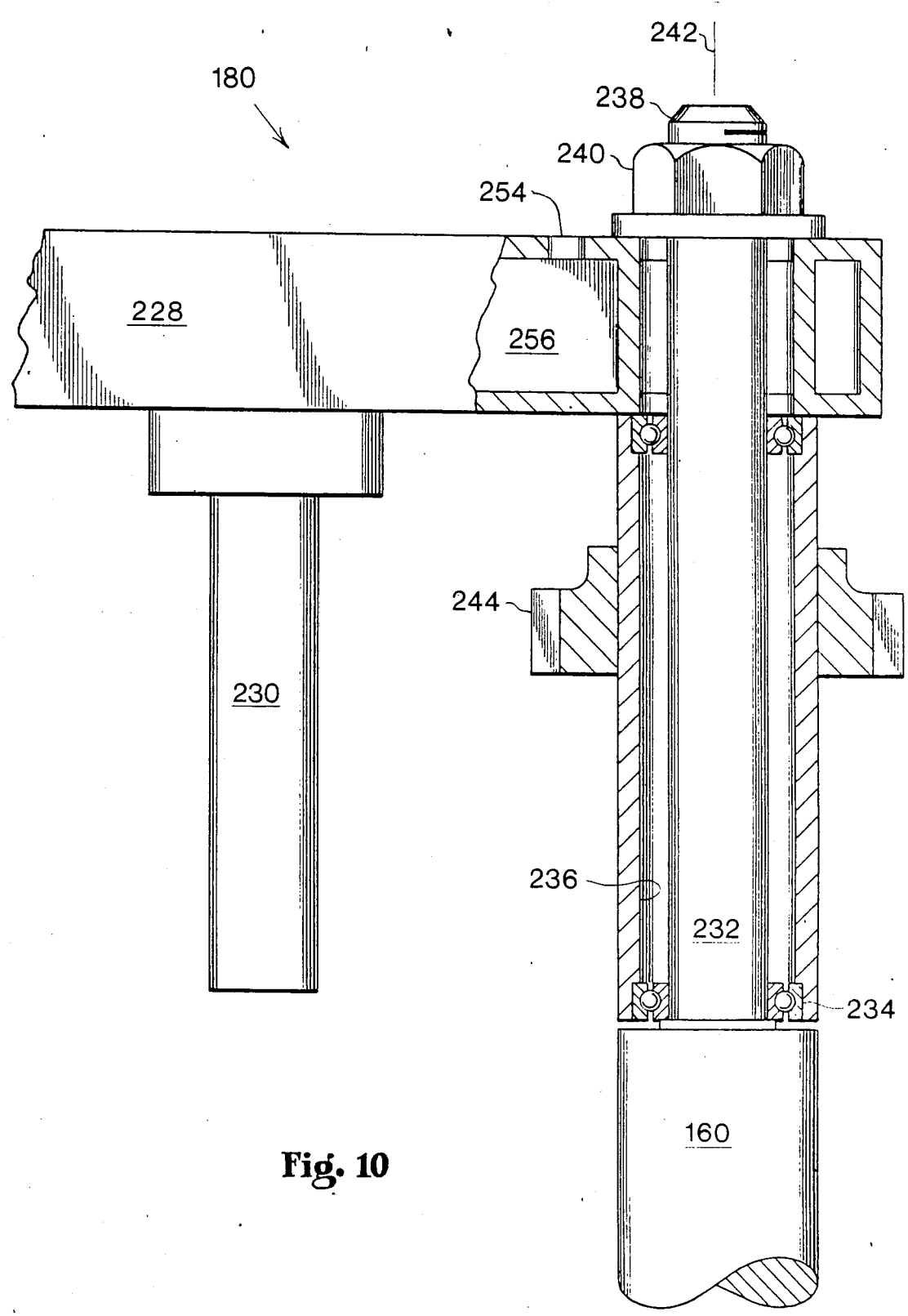
FIG. 10 is a view of the internal cooling subassembly for cooling the interior of formed containers, taken substantially as shown in FIG. 7.
Figure 11:
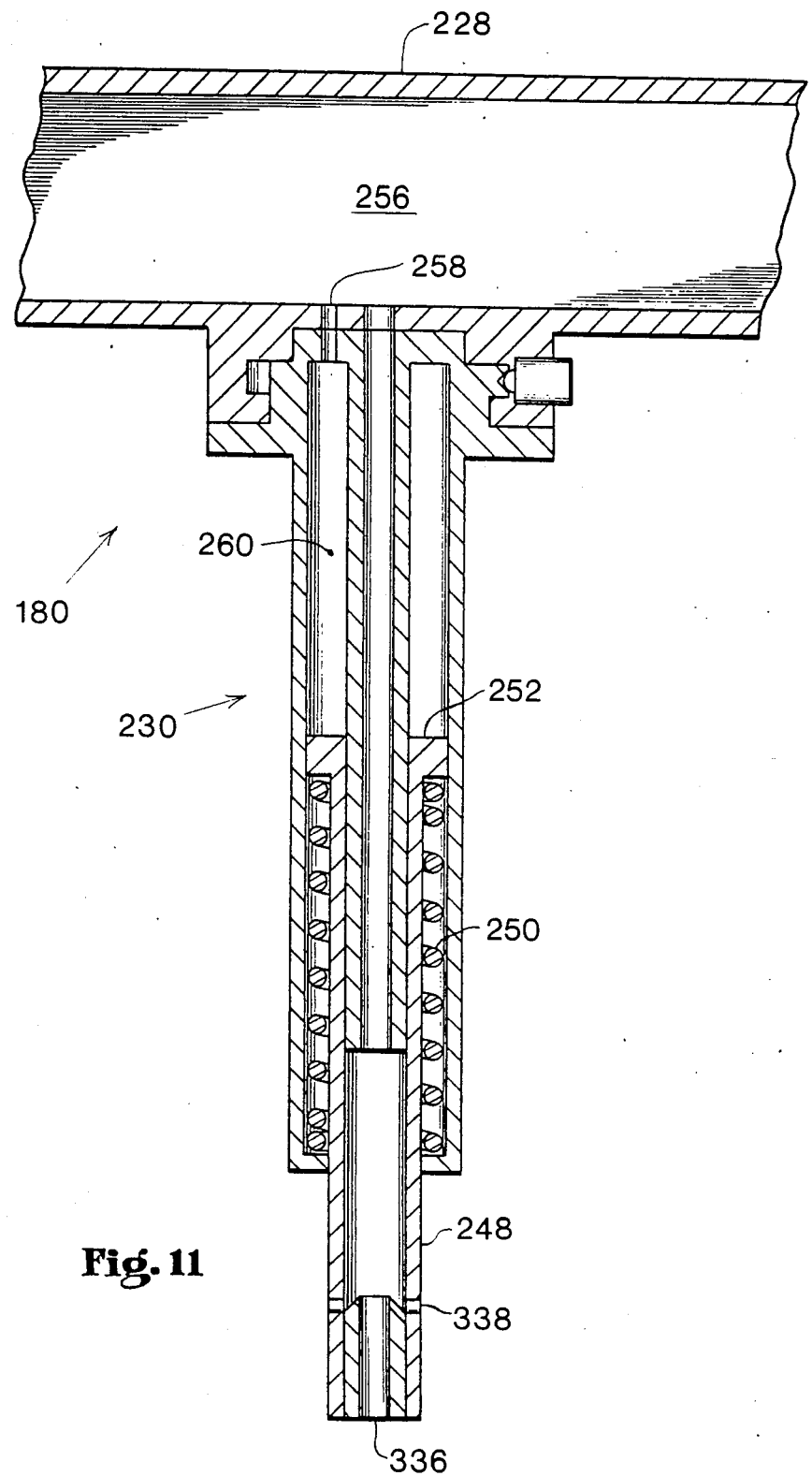
FIG. 11 is a cross sectional view of a portion of the cooling mechanism of FIG. 10, taken substantially as shown in FIG. 10, and showing the mechanism for lowering the cooling tubes into the containers.

Referring now to FIGS. 7, 10, and 11, the internal cooling subassembly 180 includes a support frame 228 having cooler heads 230 that project downwardly therefrom in spaced apart locations. The support frame 228 is mounted to the shaft 160 by means of a reduced diameter portion 232, and bearings 234 that are interposed between the reduced diameter portion 232 and an internal bore 236 of the frame 228. The reduced diameter portion 232 includes threads 238; and a nut 240, which is threaded onto the threads 238, retains the support frame 228 on the shaft 160. Thus the support frame 228 may be pivotally rotated about a vertical axis 242 of the shaft 160.

Figure 12:
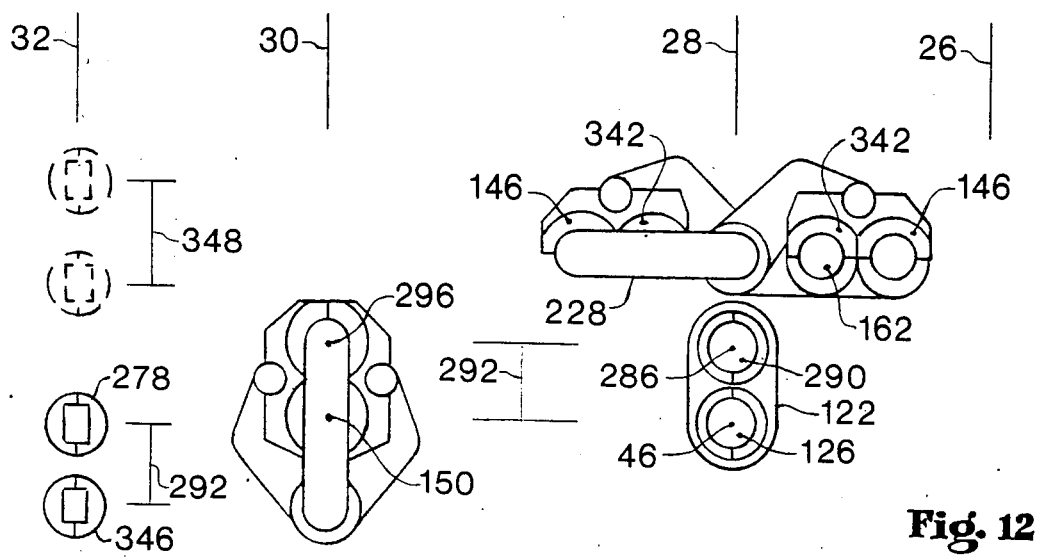
FIG. 12 is a top schematic view showing the first body forming mold assembly waiting at the forming station, with the molding and cooling portions thereof open, during the forming of a pair of parisons, showing the second body forming mold assembly at the cooling and take-out station with the molding portions thereof closed and the finished containers being internally cooled, and showing a pair of containers being deposited onto a conveyor belt at the transport station by the gripper jaws.
Figure 14:
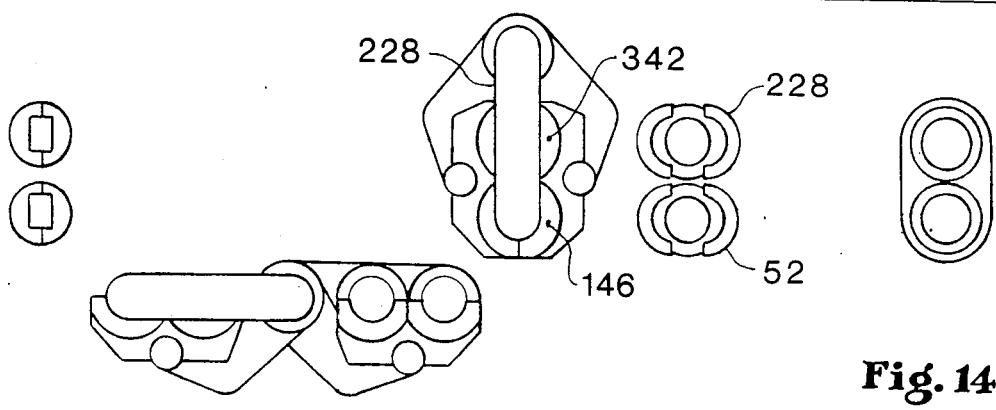
FIG. 14 is a top schematic view showing the neck rings opened and raised to allow transverse movement of the first body forming mold assembly with a pair of containers therein, showing the first body forming mold assembly of FIG. 13 moved intermediate of the forming station and the cooling and take-out stations, and showing the molding and cooling portions of the second body forming mold assembly opened both to allow transverse movement of the first body forming mold assembly toward the cooling and take-out station, and to allow transverse movement of the second body forming mold assembly toward the forming station.

The internal cooling subassembly 180 also includes positioner gears 244 and a rotary actuator 246, both of which are shown in FIG. 7, which cooperate to rotationally position the support frame 228 to a position as shown in the forming station 28 of FIG. 12, and to a position as shown intermediate of the forming station 28 and the cooling and take-out station 30 of FIG. 14 wherein the support frame 228 is positioned to insert the cooler heads 230 into respective ones of containers 88.

Referring now to FIGS. 10 and 11, the cooler heads 230 each include a retractable nozzle 248 which is retracted by a spring 250, and which is actuated to the position shown in FIG. 11 by a piston head 252 in response to pressurized fluid delivered through a port 254 of FIG. 10, to a chamber 256, and through a port 258 to an actuating chamber 260.

Although the preferred embodiment does utilize internal cooling without blow molding, it will be appreciated by those skilled in the art that in some applications it may be useful to employ blow molding techniques.

Referring now to FIGS. 1 and 4, the glassware molding machine 20 includes body mold transport carriages 132 and 134 which are slidably attached to respective ones of support guide shafts 136 and 138 that are longitudinally disposed and parallel spaced apart. The carriages 132 and 134 respectively carry body mold assemblies 140 and 142 between the forming station 28 and the cooling and take-out station 30, and are transported by rotary actuators 170 and 172, and by transport screws 174 and 176.

The body mold assembly 140 includes a pair of body side mold halves 144; and the body mold assembly 142 includes a pair of body side mold halves 146. Each of the pairs of side mold halves, 144 and 146, includes a body mold cavity 148.

In the FIG. 4 illustration, the body mold assembly 140 and its carriage 132 are located at the cooling and take-out station 30; and the body forming mold assembly 142 and its carriage 134 are located at the forming station 28. The body mold portions 144 are closed about a second vertical axis 150 in the cooling and take-out station 30; and the body mold portions 146 have been opened back away from first vertical axis 46 to approximately one hundred eighty degrees apart to allow the body forming mold assemblies 140 and 142 to bypass each other.

Referring now to FIG. 1, the body mold transport carriages 132 and 134, together with the body mold assemblies 140 and 142 thereof, bypass each other in a horizontal plane 330. This bypassing of the blank mold assemblies 140 and 142 in the horizontal plane 330 is made possible by alternate opening of the body mold assembly portions 140 and 142 as shown in FIG. 4.

Further, in the FIG. 4 illustration, a completed container, 88 of FIG. 1, has been vacuum-formed in the body mold assemby 140 while the body mold assembly 140 was in the forming station 28; and now the body mold assembly 140 has transported the container 88 to the cooling and take-out station 30. Also, at this time, the body mold assembly 142 has been transported back to the forming station 28 and is waiting for a parison, 130 of FIG. 5A, to be formed in cavity 154 of the blank mold 126.

Referring now to FIGS. 1, 2, and 16-18, the glassware molding machine 20 includes a take-out assembly 261 which includes a transport carriage 262 slidably mounted on support rods 264, and which is actuated between the cooling and take-out station 30 and the transport station 32 by means of a transport screw 266 and a rotary actuator 268.

The take-out assembly 261 further includes spacing carriages 270a and 270b which are slidably mounted to the transport carriage 262 by support rods 272. The spacing carriage 270a is transversely positionable by means of an actuating screw 274a, a rotary actuator 275a, and gears 277a. The spacing carriage 270b is transversely positionable by similar, or identically numbered and named parts.

Referring again to FIGS. 1, 2, and 16-18, each of the spacing carriages, 270a and 270b, includes: a screw bearing 372 which engages the actuating screw 280 thereof and which causes vertical movement of the actuating screw 280 as a function of the rotation thereof, a coupling 374 which connects the actuating screw 280 to the square rod 279 and which transmits vertical movement of the actuating screw 280 to the square rod 279, and a rod bearing 376 which slidably engages the square rod 279 and which allows vertical movement of the square rod 279 while prohibiting rotation thereof.

A take-out head 276, having gripper jaws 346, is attached to spacing carriage 270a by a square rod 279; and the square rod 279 is raised and lowered by an actuating screw 280, a rotary actuator 281, and gears 282.

Figure 17:
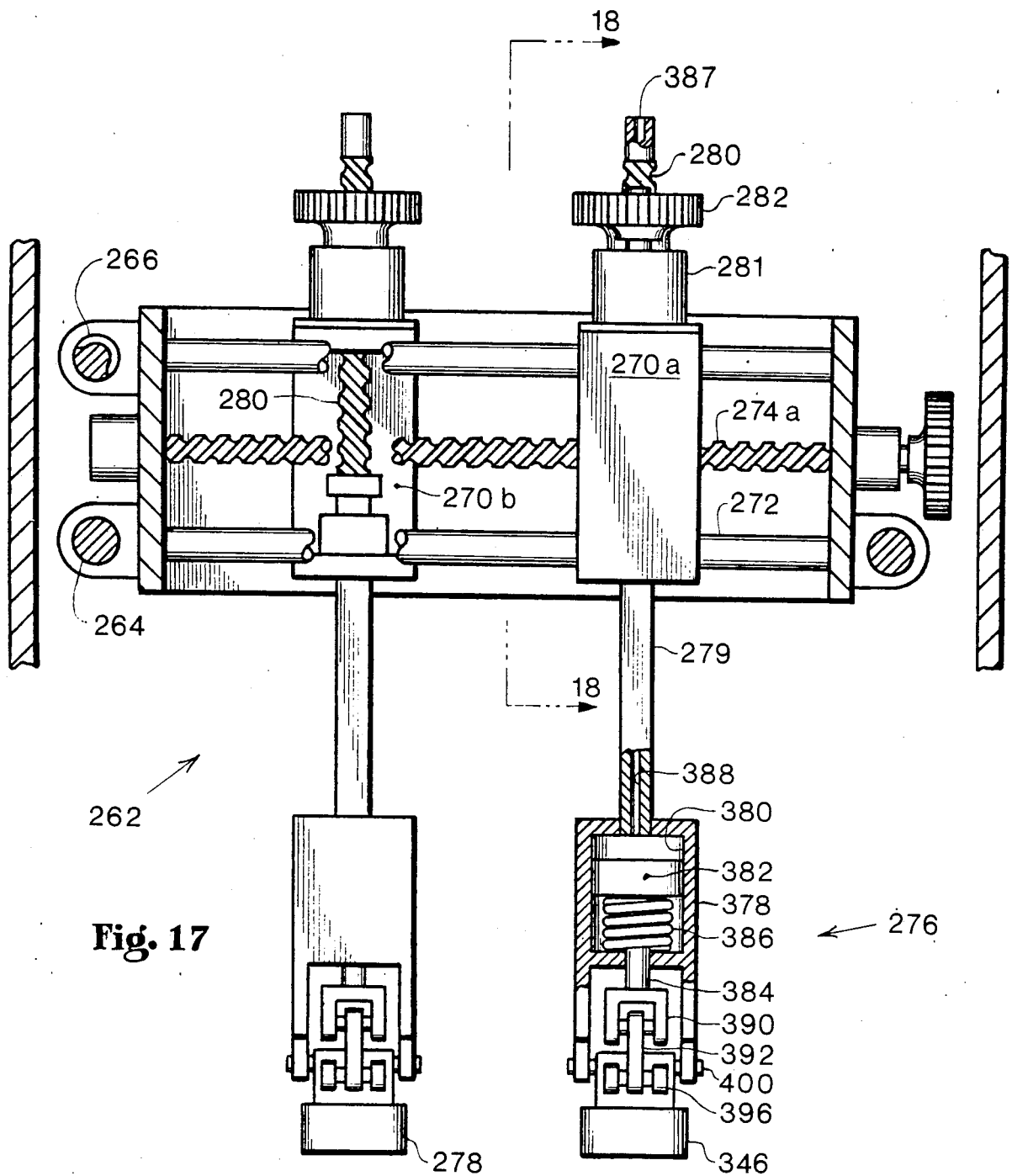
FIG. 17 is a cross-sectional view of the transport carriage of the glassware molding machine of FIG. 1, taken substantially as shown by view line 17—17 of FIG. 1, with one of the take-out heads broken away, and showing both of the spacing carriages.
Figure 18:
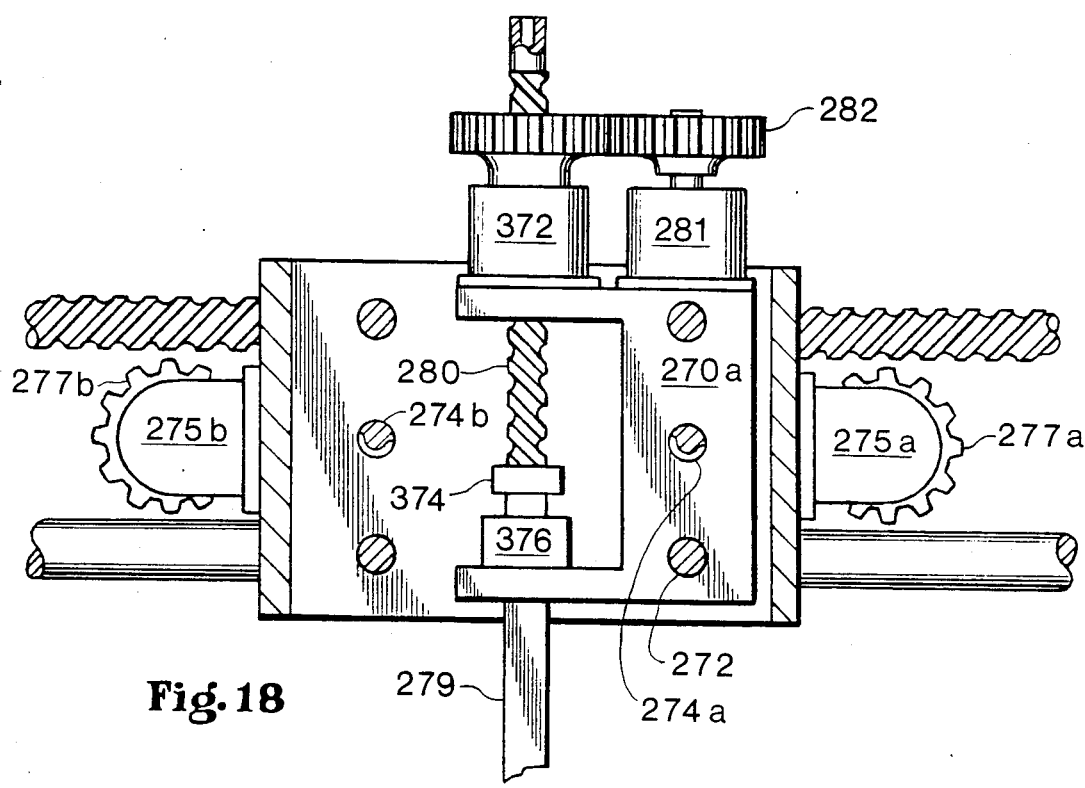
FIG. 18 is a cross sectional view of the transport carriage of FIG. 16, taken substantially as shown by section lines 18—18 on FIG. 17.

Referring now to FIG. 17, the take-out head 276 includes, in addition to the gripper jaws 346, an actuating cylinder 378. The actuating cylinder 378 includes a cylinder bore 380, a piston 382 that is slidably inserted into the bore 380, a piston rod 384 that is secured to the piston 382, and a return spring 386.

Air pressure supplied through port 387 to a longitudinal passageway 388 in the square rod 279 is supplied to the piston 382, and actuates the piston 382 and the piston rod 384 downwardly. The piston rod 384 is attached to the gripper jaws 346 by a clevis and pin 390, links 392, and a clevis and pin 396, so that downward movement of the piston rods 384, as actuated by air pressure, pivots the gripper jaws 346 around a pivot pin 400 forward to the closed position thereof, and upward movement of the piston rod 384, as resiliently urged by the return spring 386, opens the gripper jaws 346.

Referring now to FIGS. 3, 4, and 6, the molding machine 20 includes a second parison plunger 284 which is disposed around a vertical axis 286 as shown in FIG. 3, a second pair of neck ring portions 288 that are accurately disposed around the vertical axis 286 as shown in FIG. 6, and a second blank mold 290 that is disposed circumferentially around the vertical axis 286 as seen in FIG. 4. The parison plunger 284, the second neck ring portions 288, and the second blank mold 290 cooperate to form another parison simultaneous to forming one parison 130 in the blank mold 126. The first vertical axis 46 and the vertical axis 286 are spaced apart by a first distance 292, as shown in FIG. 4. Also shown in FIG. 4, the first vertical axis 46 and the vertical axis 286 are in a first vertical plane 294 at the forming station 28, the vertical axis 150 and another vertical axis 296 are located in a second vertical plane 298 at the cooling and take-out station 30, and containers 88 are deposited in a third vertical plane 300 at the transport station 32.

Figure 13:
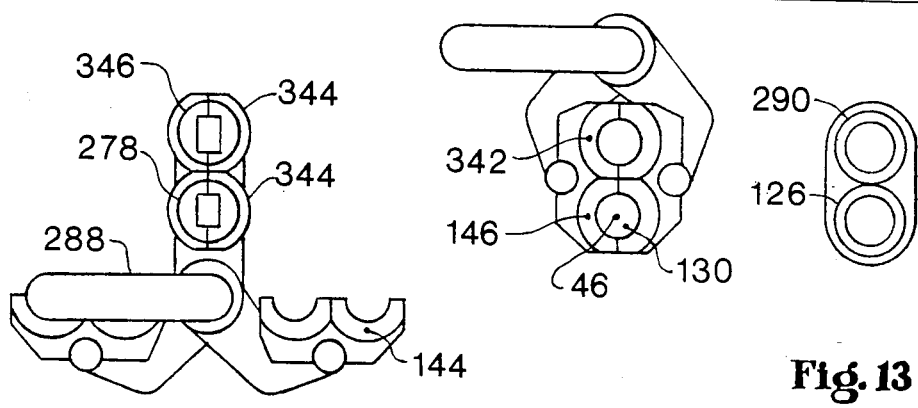
FIG. 13 is a top schematic view showing the first body forming molds closed around a pair of parisons that were formed in the FIG. 12 illustration and a pair of containers being formed by a vacuum applied to the first body forming mold assembly, showing the parison blank mold moved to the gob loading station, showing the side molding and cooling portions of the second body forming mold assembly opened at the cooling and take-out station, and showing two finished containers gripped by the gripper jaws at the cooling and take-out station while the containers are still supported by the bottom molds.

In operation, the blank mold 126 is at the gob loading station 26, as shown in FIGS. 2 and 13, and gobs 332 of molten glassware are dropped into respective ones of blank mold cavities 154 of the blank mold 126 through tubes 334 as shown in FIG. 2.

The blank mold holder 122 is actuated from the gob loading station 26 to the forming station 28 as shown in FIG. 1 by the carriage 110 and the rotary actuator 116. Then, the reciprocating actuator 118 raises the blank mold holder 122 upwardly until the blank mold 126 is in contact with the neck ring portions 52, as shown in FIG. 5A. At this time: the neck ring portions 52 are in their upper position, and are closed, as shown in FIG. 5A; the body side mold halves 146 are in their open position as shown in the forming stations 28 of FIGS. 4 and 12; the bottom mold portion 162 is pivoted away from the blank mold 126, as shown in forming stations 28 of FIGS. 4 and 12; and the support frame 228 of the internal cooling subassembly 180 is pivoted away from the parison mold 126, as shown in the forming station 28 of FIGS. 4 and 12.

With the various parts in their positions as indicated above, the parison plunger 107 is actuated downwardly into the blank mold 126 to the position shown by the line 109 in FIG. 5A, thereby forming the parison 130.

After the parison plunger 107 moves to its upper position, the blank mold 126 is lowered by the reciprocating actuator 118 and is returned back to the gob loading station 26 by the rotator actuator 116 as shown in FIG. 2. This leaves the parison 130 suspended by the neck ring portions 52 of FIG. 5A.

The body mold portions 146 are then closed around the parison 130, as shown in the forming station 28 of FIG. 13 and the neck mold subassembly 40 is moved downwardly to its lower position by actuators 64 as shown in FIG. 5; and the space between the parison 130 and the body mold portions 146 and 162 is evacuated by vacuum through the tubular projections 224, the vacuum manifold 186, the manifold chamber 212, and the vacuum tube 210, all as shown in FIG. 8; so that a completed container 88 is formed.

Figure 15:
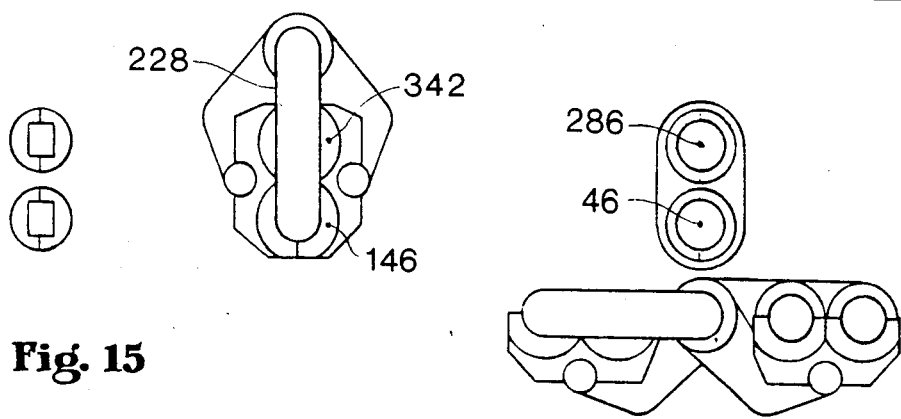
FIG. 15 is a top schematic view showing the first body forming mold assembly at the cooling and take-out station with cooling air being injected into a pair of containers, and showing the second body forming mold assembly, with the mold halves thereof open, waiting for the parison pressing operation, as was the first body forming mold assembly in the FIG. 12 illustration.
Figure 16:
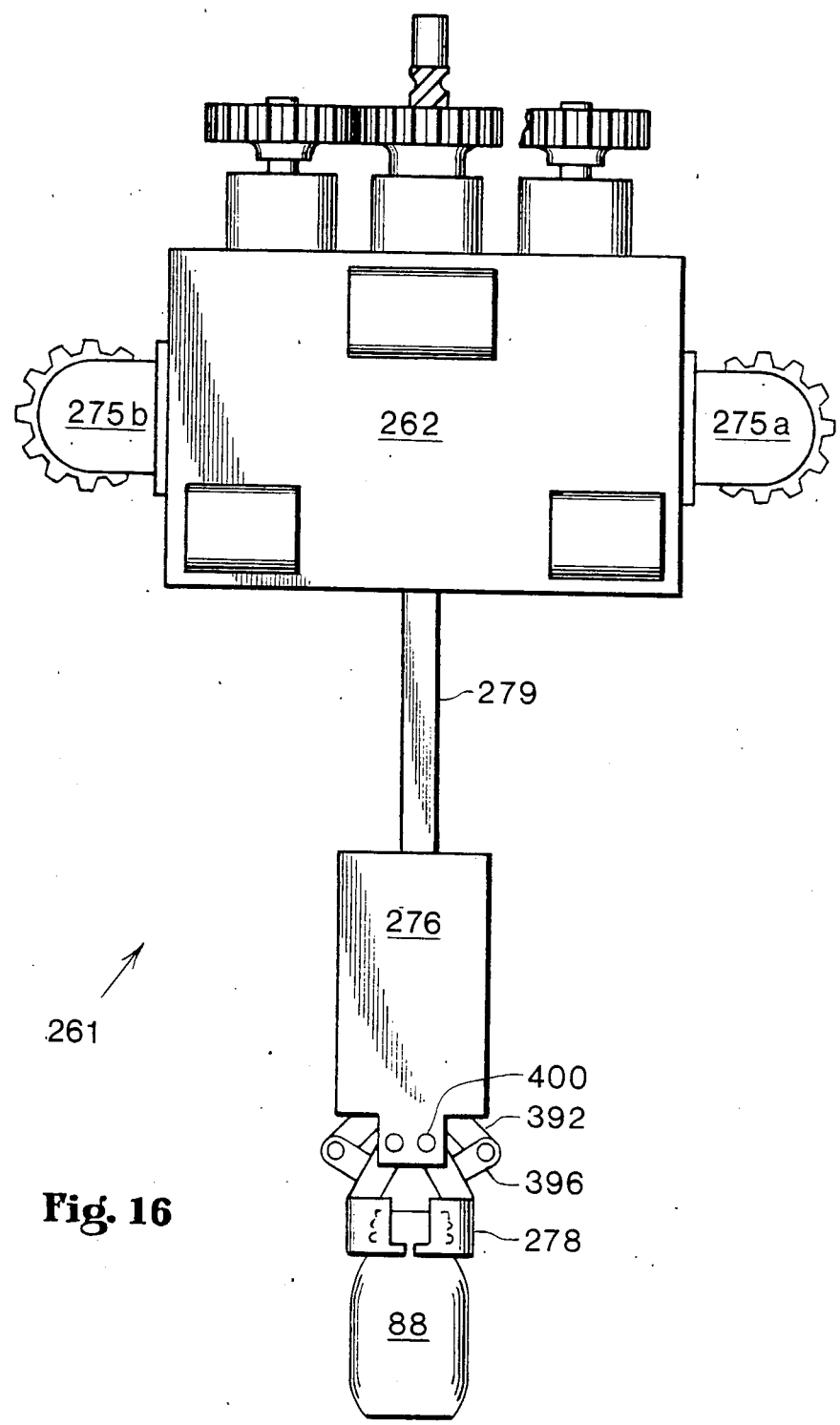
FIG. 16 is a side elevation view of the transport carriage, taken substantially as shown in FIG. 1, showing the take-out jaws in more detail.

After vacuum forming a container 88, the neck ring portions 52 open as shown in the forming station 28 of FIG. 14, and the neck mold subassembly 40 is moved upwardly by air applied to raising ports 74 of the smaller reciprocating actuators 64 of FIG. 5A, thereby allowing the containers 88 to be moved transversely from the forming station 28 to the cooling and take-out station 30 as shown in FIG. 15. This transporting of the containers 88 to the cooling and take-out station 30 is done by the actuator 172 of FIG. 4 transporting the carriage 134, and by the body mold assembly portion 142 which still enclose the containers 88.

Upon leaving the forming station 28, the support frame 228 of internal cooling assembly 180 is rotated into position over the containers 88 by the gears 244 and the rotary actuator 246 of FIG. 7; and the nozzles 248 are lowered into the containers 88 by means of fluid pressure being supplied to the piston head 252 through the port 258, as shown in FIG. 11; and cooling fluid is applied to the internal surfaces (not shown) of the containers 88 through a bottom nozzle opening 336 and side nozzle openings 338 of the nozzle 248. This cooling process is started as the containers 88 are being transported from the forming station 28 to the cooling and take-out station 30, and is completed after the containers 88 reach the cooling and take-out station 30.

At the completion of the cooling cycle, the fluid being supplied to the internal cooling assembly 180 is shut off, the spring 250 retracts the nozzle 248 within the head 230, as shown in FIG. 10, and the rotary actuator 246 cooperates with the positioner gears 244 to rotate the support frame 228 of the internal cooling assembly 180 away from containers 88.

Then the body side mold halves 146 are rotated outwardly and away from the container 88, leaving the container 88 resting on the bottom mold portion 162. The take-out head 276 is moved to the cooling and take-out station 30 by the transport carriage 262 and the rotary actuator 268, the take-out head 276 is lowered over the container 88 by respective ones of the actuating screws 280, rotary actuators 281, and gears 282.

Then the container 88 is raised upwardly by the actuating screw 280, rotary actuator 281, and gears 282, is transported to the transport station 32 by the transport carriage 262 and the rotary actuator 268, and is deposited onto a conveyor belt 340 as the gripper jaws 278 are opened.

Referring now to FIG. 12, in a double gob embodiment shown, a parison 130 is formed in each one of the parison blank molds 126 and 290; and each parison 130 is formed circumferentially around a respective one of the axes 46 and 286. Then, while the parisons 130 remain at the forming station 28 and are suspended by respective ones of the neck ring portions, 52 and 288 of FIG. 6, the pair of body forming mold portions 146 and a second pair of body forming mold portions 342, which are shown in their opened positions in FIG. 12, are closed around respective ones of the parisons 130, as shown in the forming station 28 of FIG. 13.

While the body forming mold portions 146 and 342 are closed around the parisons 130, air from between the parisons 130 and respective ones of the body forming mold portions 146 and 342 is evacuated by the vacuum forming mechanism 183 of FIGS. 7 and 8, forming a pair of containers 88.

After completion of vacuum forming of the parisons 130 into a pair of completed containers 88, neck ring portions 52 are opened and raised, and the closed forming mold portions 146 and 342 are transported rectilinearly from the forming station 28 toward the cooling and take-out station 30, carrying the completed containers 88 therein.

At a point intermediate of the forming station 28 and the cooling and take-out station 30, the support frame 228 of the internal cooling assembly 180 is rotated over the forming mold portions 146 and 342; the retractable nozzles 248 are lowered into respective ones of the containers 88; and cooling fluid is applied to the interior neck, side and bottom surfaces (not shown), of the containers 88. This cooling process continues while the containers 88 are transported to the cooling and take-out station 30 and until the desired reduction in temperature is achieved.

After completion of the cooling cycle, the retractable nozzles 248 are raised, the support frame 228 of the internal cooling assembly 180 is rotated away from the containers 88, as illustrated by the support frame 228 in the cooling and take-out station 30 of FIG. 13, and the forming mold portions 146 and 342 open away from the containers 88, as illustrated by the forming mold portions 144 in the cooling and take-out station 30 of FIG. 13, leaving the containers 88 supported by a bottom mold portions 344.

At this time, the gripper jaws 278 and 346 each grasp one of the containers 88. Then the containers 88 are transported to the transportation station 32 where they are deposited onto the conveyor belt 340 of FIG. 1. Optionally, before depositing the containers 88 on the conveyor belt 340, the distance between the containers 88 is changed from the first distance, 292 of FIG. 12, which is common to the spacing between both the parisons 130 and the containers 88, to a second distance 348 by transversely moving one or both of the gripper jaws 278 or 346, by means of one or both of the spacing carriages, 270a and/or 270b, one or both of the actuating screws, 274a or 274b, and one or both of the rotary actuators 275, as shown in FIGS. 1, 2, and 16-18.

As the containers 88 are being deposited on the moving conveyor belt 340, the gripper jaws 278 and 346 are moving with the same direction and speed as the conveyor belt 340, so that there is no relative horizontal motion between the containers 88 and the conveyor belt 340. It is thus appreciated that the subject invention also provides for means for depositing articles of glassware onto a moving receiving surface at the same horizontal velocity as the moving surface.

In summary, the present invention provides a plunger and neck mold assembly 34 which includes means, comprising the support plate 36 and the rod 70, for guiding the parison plunger 107 and the neck mold portions 52 and 81 along the vertical axis 46, and means, comprising the finish guide sleeve 80, for radially alinging the parison plunger 107 and the neck mold portions 52 and 81.

The present invention provides means, comprising the carriage 110, the parison blank mold 126, the parison plunger 107, and the neck mold portions 52 and 81, for collecting gobs 332 of glass at the gob loading station 26, for transporting the gobs 332 to the forming station 28, for raising the parison blank mold 126 upwardly and into contact with the neck mold portions 52, for lowering the parison plunger 107 into the parison blank mold 126, for forming a parison 130, for lowering the parison blank mold 126, for transporting the parison blank mold 126 back to the gob loading station 26, and for supporting the parison 130 by the neck mold portions 52.

The present invention provides body forming mold means, comprising the body side mold halves 146, the bottom mold portion 162, and the vacuum forming mechanism 183, for forming a container 88 from the parison 130 while the parison 130 is supported by the neck ring portions 52, and without removing the parison 130 from the first vertical axis 46 in the forming station 28.

The present invention includes means, comprising lowering neck ring portions 52 to communicate with body mold portions 146, comprising moving the neck ring portions 52 transversely to opened positions, and comprising moving the neck mold subassembly 40 upwardly away from the completed container 88 to the position shown in FIG. 5A for allowing the completed container 88 to be transported rectilinearly from the forming station 28 to the cooling and take-out station 30 in a common horizontal plane 330.

The present invention includes means, comprising the internal cooling subassembly 180, for selectively cooling the internal neck, side and bottom surfaces of the containers 88, both while the containers 88 are being transported from the forming station 28 to the cooling and take-out station 30, and while the containers 88 remain at the cooling and take-out station 30.

The present invention includes means, comprising using two body forming mold assemblies, 140 and 142, for one blank mold assembly 108, and comprising opening, closing, and transporting the body mold assemblies 140 and 142 independently of each other, for increasing productivity of the glassware molding machine 20.

The present invention includes means, comprising opening respective ones of the body mold assemblies 140 and 142, and comprising opening and raising the neck mold subassembly 40, for permitting rectilinear movement of the body mold assemblies 140 and 142 from the forming station 28 to the cooling and take-out station 30, and for permitting rectilinear movement of the body mold assemblies 140 and 142 from the cooling and take-out station 30 to the forming station 28, in the same horizontal plane 330.

The present invention includes means, comprising the spacing carriage 270 and the rotary actuator 275, for changing the first distance between the containers 88 from the first distance 292 to a second distance 348 prior to depositing the containers 88 on a conveyor belt 340, thereby achieving optimum distance between containers both for preventing damage in transport and for achieving optimum utilization of an annealing lehr (not shown).

The present invention provides cooling means, comprising the cooling holes 92 in the finish guide sleeve 80 and the cooling holes 93 and 94 in the neck mold portions 52 and 81, for cooling the heat removal portions of neck mold portions 52 and 81 to achieve optimum temperature and viscosity differences between the portions of the parison 130 that are formed in the neck mold portions 52 and 81 and the portions of the parison 130 that are subsequently vacuum formed.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

INDUSTRIAL APPLICABILITY

The present invention is applicable to glassware molding machines, and to processes for molding of glassware, in which a parison 130 is formed from a gob 332 of glass, and a finished container, or article of glassware, 88 is vacuum and/or blow molded from the parison 130.

I claim:

1. An individual section glassware molding machine which comprises:
   a neck mold subassembly being guided for vertical movement exclusively along a first vertical axis, and having neck mold portions including neck ring portions that are moveable to opened and closed positions by movement transverse to said first vertical axis;
   means, comprising said neck mold portions, a parison plunger, and a parison blank mold, for forming a parison, and for suspending said parison by said neck ring portions;
   body forming mold means, comprising body forming mold portions, for cooperating with said neck ring portions in forming an article of glassware from said parison without moving said parison transversely with respect to said first vertical axis;
   means for moving said neck mold portions along said first axis and away from said body forming mold portions and said article of glassware; and
   means for transporting said body mold portions, with said article of glassware therein, from said first station and said first axis, to a second station.

2. An individual section glassware molding machine which comprises:
   a forming station and a take-out station that are longitudinally spaced apart;
   a neck mold subassembly, being disposed in said forming station, being guided for vertical movement exclusively along a first vertical axis, and having neck mold portions including neck ring portions that are moveable to opened and closed positions by movement transverse to said first vertical axis;
   a parison plunger being disposed above said neck mold subassembly, being disposed circumferentially around said first vertical axis, and being guided for movement along said first vertical axis;
   parison molding means, comprising a parison blank mold, for movement of said parison blank mold upwardly into engagement with said neck ring portions;
   means, comprising said neck mold portions, said parison plunger, and said parison blank mold, for forming a parison around said vertical axis, and for suspending said parison by said neck ring portions; and
   body forming mold means having separable body forming mold portions that are moveable to opened and closed body positions, for cooperating with said neck ring portions to form an article of glassware from said parison while said parison is disposed around said first vertical axis;
   means for moving said neck mold portions along said first axis and away from said body forming mold portions and said article of glassware; and
   means for transporting said body forming mold portions, with said article of glassware therein, from said first station and said first axis, to said second station.

3. An individual section glassware molding machine as claimed in claim 2 in which said molding machine includes a gob loading station that is longitudinally spaced apart from said first vertical axis; and
   said molding machine comprises means for depositing a gob of glass into said parison blank mold.

4. An individual section glassware molding machine as claimed in claim 2 in which said molding machine includes a gob loading station;
   said parison blank mold means includes carriage means for transporting said parison blank mold from said molding station to said gob loading station, and for transporting said parison blank mold from said gob loading station to said first vertical axis in said molding station.

5. An individual section glassware molding machine as claimed in claim 2 in which said molding machine includes a second vertical axis that is spaced apart from said first vertical axis by a first distance;
   said molding machine comprises means, including a second parison plunger that is disposed around said second vertical axis, for making a second parison around said second vertical axis substantially simultaneous to making the first said parison around said first vertical axis;
   said molding machine includes means for forming a second article of glassware around said second vertical axis substantially simultaneous to forming said article of glassware around said first vertical axis;
   said molding machine includes means for depositing said article of glassware on a conveyor at selected spacing therebetween regardless of said first distance between said first and second vertical axes.

6. An individual section glassware molding machine as claimed in claim 5 in which said first and second vertical axes are in a first vertical plane; said depositing of said articles of glassware at said selected spacing is in a second vertical plane that is parallel and spaced apart from said first vertical plane.

7. An individual section glassware molding machine as claimed in claim 2 in which said guiding of said neck mold subassembly, and said guiding of said parison plunger comprises operative interconnection of said neck mold subassembly and said parison plunger.

8. An individual section glassware molding machine as claimed in claim 2 in which said glassware molding machine includes a support plate that is disposed transversely to said first vertical axis; and
   said guiding means of said neck mold subassembly comprises said support plate, and a plurality of rods that are disposed parallel to said first vertical axis, that are spaced apart from said first vertical axis, and that guidingly interconnect said support plate and said neck mold subassembly.

9. An individual section glassware molding machine as claimed in claim 8 in which said glassware molding machine includes actuating means for reciprocally actuating said parison plunger; and
said means of guiding said parison plunger comprises operative connection of said actuating means to said support plate.

10. An individual section glassware molding machine as claimed in claim 2 in which said parison plunger is movable to a down position wherein a portion of said parison plunger extends through said neck mold portions; and
said molding machine includes radial aligning means, comprising a sleeve, that is disposed circumferentially around said parison plunger, for radially aligning said parison plunger with respect to said neck mold portions.

11. An individual section glassware molding machine as claimed in claim 10 in which said molding machine includes top finish mold means, comprising a top finish mold surface that fixedly engages said sleeve, for cooperating in maintaining alignment of said parison plunger with said neck mold portions.

12. An individual section glassware molding machine which comprises:
a forming station and a take-out station that are longitudinally spaced apart;
a neck mold subassembly being disposed in said forming station, being guided for movement exclusively along a first vertical axis in said forming station, and having neck mold portions including neck ring portions that are moveable to opened and closed positions by movement transverse to said first axis;
means, comprising said neck mold portions, a parison plunger, and a parison blank mold, for successively forming parisons circumferentially around said first vertical axis, and for suspending successive ones of said parisons by said neck ring portions;
first and second body forming mold means, each comprising separable body forming mold portions, for alternate movement of separate ones of said body forming mold portions to said forming station, for alternate cooperation with said neck ring portions in forming articles of glassware from successive ones of said parisons, and for alternate conveying of said articles of glassware to said take-out station with said articles of glassware therein; and
means for moving said neck mold portions along said first vertical axis and away from said body forming mold portions and said articles of glassware.

13. A glassware molding machine as claimed in claim 12 in which said first body forming mold means comprises a first carriage that is slidably mounted for rectilinear movement between said forming station and said take-out station;
said second body forming mold means comprises a second carriage that is slidably mounted for rectilinear movement between said forming station and said take-out station; and
means, comprising alternate opening of said body forming mold portions of said first and second body forming mold means, for permitting said first and second body forming mold means to move back and forth between said forming station and said take-out station in the same horizontal plane.

14. A glassware molding machine as claimed in claim 13 in which said molding machine includes means for separately timing movement of said first and second carriages between said forming station and said take-out station, and for separately timing said opening of said body forming mold portions of said first and second body forming mold means.

15. A method for molding an article of glassware, which method comprises:
(a) forming a first parison around a single axis in a first station within a cavity defined by a neck mold having neck ring portions, a parison blank mold, and a parison plunger;
(b) removing said parison plunger and said parison blank mold from said first parison;
(c) suspending said first parison around said single axis by said neck ring portions;
(d) closing a first body forming mold around said single axis and said first parison;
(e) forming a first article of glassware from said first parison around said single axis in said first body forming mold while being suspended by said neck ring portions;
(f) transversely separating said neck ring portions away from said single axis and said first article of glassware;
(g) moving said neck mold with neck ring portions thusly separated along said single axis and away from said first body forming mold and said first article of glassware; and
(h) transporting said first body forming mold with said first article of glassware therein from said first station and said single axis to a second station.

16. A method as claimed in claim 15 in which said method further comprises:
(a) forming a second parison around said single axis in said first station within a cavity defined by said neck mold having neck ring portions, said parison blank mold, and said parison plunger;
(b) removing said parison plunger and said parison blank mold from said second parison;
(c) suspending said second parison around said single axis by said neck ring portions;
(d) transporting a second body forming mold from said second station to said first station;
(e) closing said second body forming mold around said single axis and said second parison; and
(f) forming a second article of glassware in said second body forming mold and said neck mold.

17. A method as claimed in claim 16 in which said transporting of said first body forming mold from said first station to said second station comprises rectilinearly transporting said first body forming mold in a closed position; and
said method comprises rectilinearly transporting said second body forming mold from said second station to said first station in an open position.

18. An apparatus for molding an article of glassware from a parison, comprising:
(a) means for forming a parison around a single axis at a first station, said forming means including a neck mold having neck ring portions, a parison blank mold associated with said neck mold, and parison plunger means for introducing into and out of said neck mold and said parison blank mold;
(b) means for removing said parison plunger means and said parison blank mold from said parison;

(c) means for maintaining said parison suspended around said single axis by said neck ring portions;
(d) means for closing a body forming mold around said single axis and said parison;
(e) means for forming the article of glassware from said parison around said single axis in said body forming mold while being suspended by said neck ring portions;
(f) means for separating said neck ring portions away from said single axis and said article of glassware;
(g) means for moving said neck mold with said neck ring portions thusly separated along said single axis and away from said body forming mold and said article of glassware; and
(h) means for transporting said body forming mold with said article of glassware therein from said first station and said single axis to a second station.

19. An apparatus as recited in claim 18 which further comprises reciprocating actuator means being operatively connected to said parison plunger means for reciprocating actuation of said parison plunger means along said single axis, a neck mold subassembly including neck ring portions arcuately disposed about said single axis and moveable with respect to said single axis to open and closed positions; and means for structurally interconnecting said reciprocating actuator means and said neck mold subassembly and for radially aligning said parison plunger means with said neck mold.

20. An apparatus as recited in claim 19 in which said means for structurally interconnecting and for radially aligning comprises a support plate, and a plurality of rods that are transversely spaced from said first axis and that are disposed parallel thereto.

21. An apparatus as recited in claim 19 in which said means for radially aligning comprises a sleeve that is circumferentially disposed around said parison plunger means, that operatively engages said parison plunger means, and that operatively engages said neck mold.

22. An apparatus as recited in claim 19 in which said assembly includes top finish means that fixedly engages said sleeve, comprising a top finish mold surface, for cooperating in maintaining alignment of said parison plunger means with said neck mold.

* * * * *